United States Patent
Lonkar et al.

(10) Patent No.: US 10,642,880 B2
(45) Date of Patent: May 5, 2020

(54) SYSTEM AND METHOD FOR IMPROVED VIDEO STREAMING

(71) Applicant: VUDU, INC., Bentonville, AR (US)

(72) Inventors: Gajanan Lonkar, Fremont, CA (US); Stefan Belavy, Oakland, CA (US); Ping-Hsien Lin, Milpitas, CA (US); Vikas Deshpande, Fremont, CA (US); Gouri Deshpande, Sunnyvale, CA (US); Sirisha Naga Lakshmi Yenigalla, Fremont, CA (US); Wendy Coquilla, San Jose, CA (US); Christine Park, San Francisco, CA (US)

(73) Assignee: VUDU, INC., Sunnyvale, CA (US)

( * ) Notice: Subject to any disclaimer, the term of this patent is extended or adjusted under 35 U.S.C. 154(b) by 227 days.

(21) Appl. No.: 14/578,102

(22) Filed: Dec. 19, 2014

(65) Prior Publication Data

US 2016/0099991 A1 Apr. 7, 2016

Related U.S. Application Data

(60) Provisional application No. 62/059,997, filed on Oct. 5, 2014.

(51) Int. Cl.

| | |
|---|---|
| *G06F 16/435* | (2019.01) |
| *G06F 3/0482* | (2013.01) |
| *G06F 3/0484* | (2013.01) |
| *G06F 16/44* | (2019.01) |
| *G06F 16/438* | (2019.01) |
| *H04L 29/06* | (2006.01) |

(52) U.S. Cl.
CPC .......... *G06F 16/435* (2019.01); *G06F 3/0482* (2013.01); *G06F 3/04842* (2013.01); *G06F 16/4387* (2019.01); *G06F 16/44* (2019.01); *H04L 65/4084* (2013.01); *H04L 65/601* (2013.01)

(58) Field of Classification Search
CPC .......... G06F 17/30029; G06F 3/04842; G06F 3/0482; G06F 17/30053; G06F 17/30058; H04L 65/4084; H04L 65/601; H04N 21/42204; H04N 21/43615; H04N 21/472; H04N 21/482
USPC ...................................................... 709/219
See application file for complete search history.

(56) References Cited

U.S. PATENT DOCUMENTS 7,260,309 B2    8/2007  Gutta
8,315,977 B2    11/2012 Anand et al.
(Continued)

OTHER PUBLICATIONS

VLC (Documentation: VLC for dummies; May 21, 2014). p. 2.*

*Primary Examiner* — Tan Doan
(74) *Attorney, Agent, or Firm* — Bryan Cave Leighton Paisner LLP

(57) ABSTRACT

A system and method for improved video streaming is disclosed herein. After receiving a log-in request from a user, an embodiment can access the user's account information to find available media files for the user. An embodiment can then determine if any of the available media files for the user are partially viewed. The partially viewed media files are displayed to the user, including a title of the media file and a viewed time of each media file. Thereafter, a user can select one of the list of partially viewed media files. Playback of the media file begins at the viewed time of the selected media file. Other embodiments are also disclosed herein.

24 Claims, 16 Drawing Sheets

(56) References Cited

U.S. PATENT DOCUMENTS

| | | | |
|---|---|---|---|
| 8,689,255 B1 | 4/2014 | Gregov et al. | |
| 9,594,751 B1* | 3/2017 | Gill | G06F 17/30 |
| 2004/0064476 A1* | 4/2004 | Rounds | G06F 17/30017 |
| 2006/0236349 A1* | 10/2006 | Lee | G06F 3/0482 |
| | | | 725/80 |
| 2009/0300016 A1 | 12/2009 | Kile, Jr. | |
| 2011/0099519 A1* | 4/2011 | Ma | G06F 3/0482 |
| | | | 715/811 |
| 2012/0210343 A1* | 8/2012 | McCoy | H04N 21/25875 |
| | | | 725/25 |
| 2012/0330760 A1* | 12/2012 | Zito | G06F 17/30873 |
| | | | 705/14.73 |
| 2014/0108614 A1 | 4/2014 | Gunderson et al. | |
| 2015/0309715 A1* | 10/2015 | Higa | G06F 3/0482 |
| | | | 715/717 |
| 2016/0066040 A1* | 3/2016 | Webster | H04N 21/4668 |
| | | | 725/34 |

* cited by examiner

SYSTEM AND METHOD FOR IMPROVED VIDEO STREAMING

CROSS-REFERENCE TO RELATED APPLICATIONS

This application claims the benefit of Provisional Patent Application Ser. No. 62/059,997, filed Oct. 5, 2014, incorporated herein by reference.

TECHNICAL FIELD

This disclosure relates generally to a media files, and relates more particularly to physical media files and related streaming media files.

BACKGROUND

People often desire to view or listen to content at their home or place of business. Content can include media such as movies, television shows, and music. Music is often purchased in the form of physical media such as CDs as well as via digital media, such as MP3s. Music can also be streamed. Movies and television shows can be purchased in the form of physical media such as DVDs and Blu-rays. Movies also can be streamed or downloaded using a variety of file formats and streaming services. It can be desirable to provide an improved viewing experience for users of a streaming service.

BRIEF DESCRIPTION OF THE DRAWINGS

To facilitate further description of the embodiments, the following drawings are provided in which.

Figure 1:
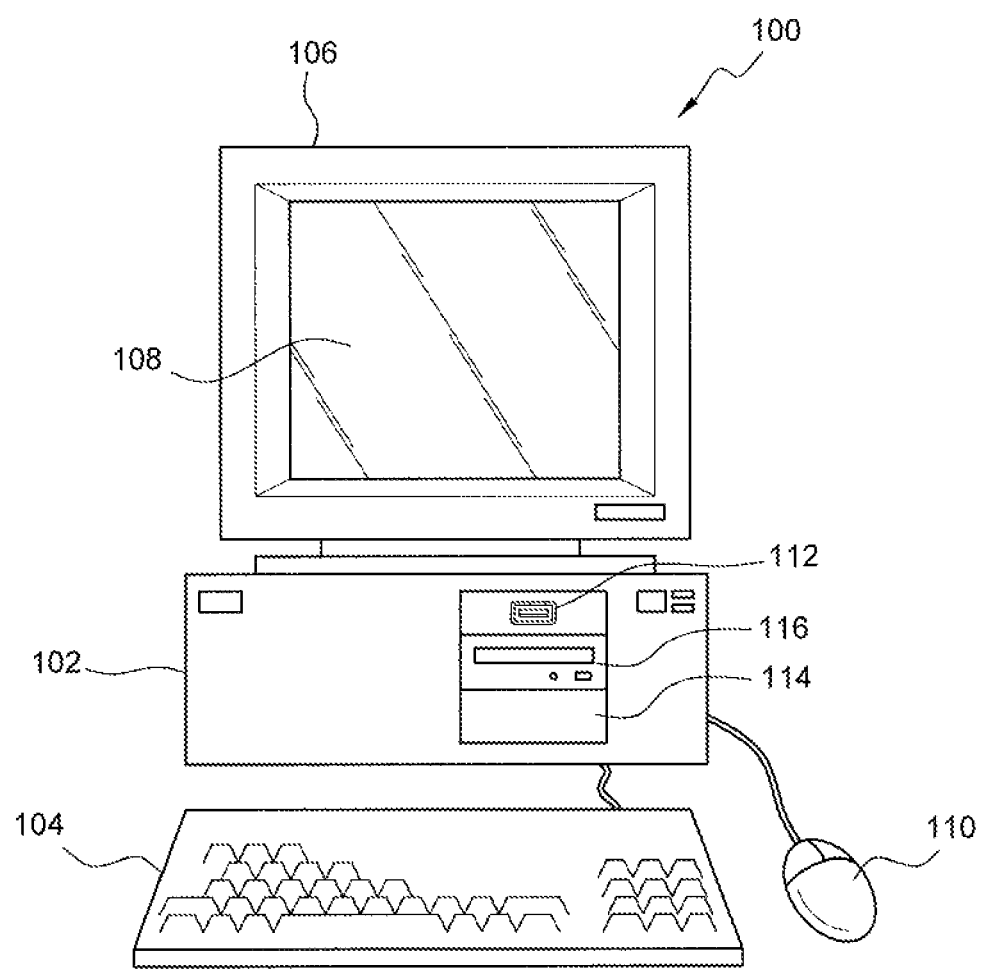
FIG. 1 illustrates a front elevation view of a computer system that is suitable for implementing an embodiment of the system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a method can comprise: receiving a log-in request from a user; accessing the user's account information to find available media files for the user; determining if any of the available media files for the user are partially viewed to form a list of two or more partially viewed media files; transmitting for display information regarding the list of one or more partially viewed media files, the information including a title and a viewed time for each media file in the list of two or more partially viewed media files; receiving a selection from the user indicating the desire to watch one of the list of two or more partially viewed media files; and transmitting the selected partially viewed media file in such a manner to result in playback of the selected partially viewed media file starting at the viewed time of the selected partially viewed media file.

In one embodiment, a system can comprise: one or more processing modules; and one or more non-transitory storage modules storing computing instructions configured to run on the one or more processing modules and perform the acts of: receiving a log-in request from a user; accessing the user's account information to find available media files for the user; determining if any of the available media files for the user are partially viewed to form a list of two or more partially viewed media files; transmitting for display information regarding the list of one or more partially viewed media files, the information including a title and a viewed time for each media file in the list of two or more partially viewed media files; receiving a selection from the user indicating the desire to watch one of the list of two or more partially viewed media files; and transmitting the selected partially viewed media file in such a manner to result in playback of the selected partially viewed media file starting at the viewed time of the selected partially viewed media file.

In one embodiment, a method can comprise: receiving a log-in request from a user; accessing the user's account information to find available media files for the user; receiving a selection from the user indicating the desire to watch one of the available media files; transmitting the selected media file in such a manner to the user to result in playback of the selected media file; receiving an indication from the user to stop playback of the selected media file; and storing the viewed time of the selected media file with the user's account information.

In one embodiment, a system can comprise: one or more processing modules; and one or more non-transitory storage modules storing computing instructions configured to run on the one or more processing modules and perform the acts of: receiving a log-in request from a user; accessing the user's account information to find available media files for the user; receiving a selection from the user indicating the desire to watch one of the available media files; transmitting the selected media file in such a manner to the user to result in playback of the selected media file; receiving an indication from the user to stop playback of the selected media file; and storing the viewed time of the selected media file with the user's account information.

Figure 2:
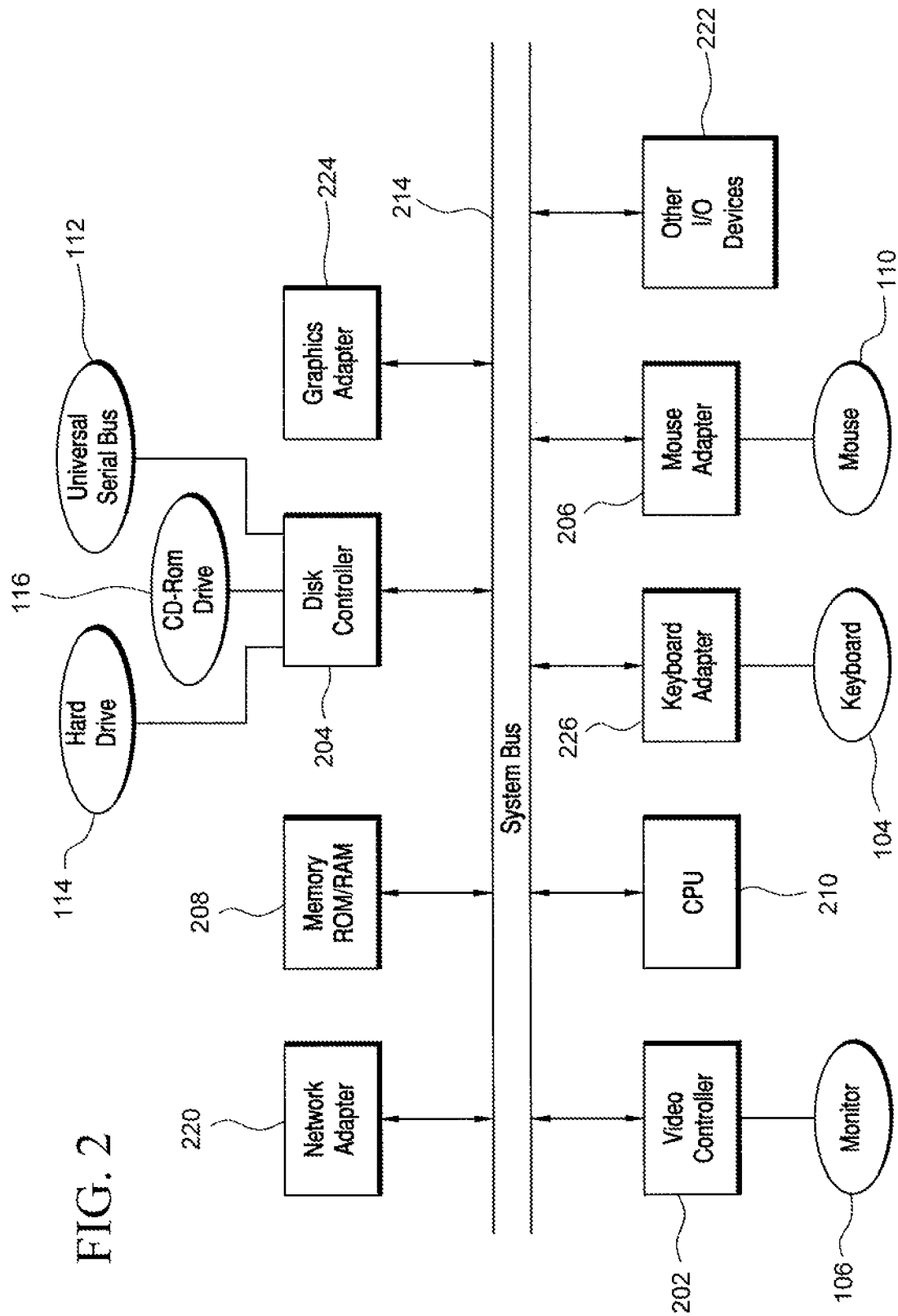
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) also can be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. It should also be understood that a particular configuration of computer system 100 might or might not contain each of the items shown in FIG. 1 or 2 or might in fact contain multiple of each of the items shown in FIG. 1 or 2. For example, certain implementations of computer system 100 might not contain a CD-ROM, DVD, or Blu-ray drive 116. Other implementations of computer system 100 might contain two CD-ROM, DVD, or Blu-ray drives 116. Other implementations of computer system 100 can contain 2 or more monitors 106. Other implementations of computer system 100 could contain no monitors. Other implementations of computer system 100 can contain equivalents to certain items. For example, hard drive 114 can be replaced or augmented by a solid-state drive (SSD). Computer system 100 could be a special-purpose machine, such as a set-top box or video game console. In other embodiments, computer system 100 can be a general-purpose computer.

Today's technology provides many different ways for users to access content. Optical discs provide music, movie, and television ("TV") show content to users in a high-quality, yet compact medium. High-speed Internet allows users to "stream" or otherwise download content over the Internet to their Internet-capable devices, without the need to use physical media. The terms stream and download might be used interchangeably in the remainder of this specification. Exemplary content can include, but is not limited to, movies, music, TV shows, books, magazines, podcasts, radio shows, and the like. Internet-capable devices can include, but are not limited to, set-top boxes, gaming consoles, personal computers, tablets, smartphones, and the like. Some Internet-capable devices also provide the capability to read optical media, such as compact discs (CDs), Digital Versatile Discs (DVDs), and Blu-ray through the use of an attached or built-in optical reader and/or writer. As of 2014, exemplary Internet capable devices can include smartphones, tablets such as Apple's iPad, Microsoft's Surface, Samsung's Galaxy Tab, and Amazon's Kindle Fire, set top boxes or plug-in devices such as Roku, Google's Chromecast, and Apple TV, video game devices such as Sony's Playstation 3 and Playstation 4, Nintendo's Wii and Wii U, and Microsoft's Xbox 360 and Xbox One, personal computers (including both desktop and laptop devices), Blu-ray and DVD drives, and smart TVs.

With such a device, a user can select content that he wishes to read, view, and/or hear. The user can read, view, and/or hear the content on or from a built-in display, or via an attached TV, monitor, and/or speakers.

Embodiments provide a method and system by which users can navigate across movie and TV shows and find their desired content quickly and easily. In one embodiment, a user is able to access a watch list, where the user can view a list of which media files he has previously watched or started to watch. In such a manner, a user is able to view a movie or an episode of a TV show at the point they stopped watching, even if the user is on a different device.

In some embodiments, after a user signs in to a streaming account, the user can be presented with a listing of all TV episodes and movies that the user has started watching, but did not finish watching. This data can be tracked in one of a variety of ways known in the art. For example, a streaming service often keeps track of when a user has stopped viewing a movie or TV episode. The streaming service can have several reasons for tracking such information. For example, the streaming service might need to know where a particular user is because the streaming service needs to know which portion of the movie or TV episode to transmit next. The streaming service might also keep track of such information because users often pause content, either on purpose or accidentally (for example, in the event of a power outage.)

Figure 3:
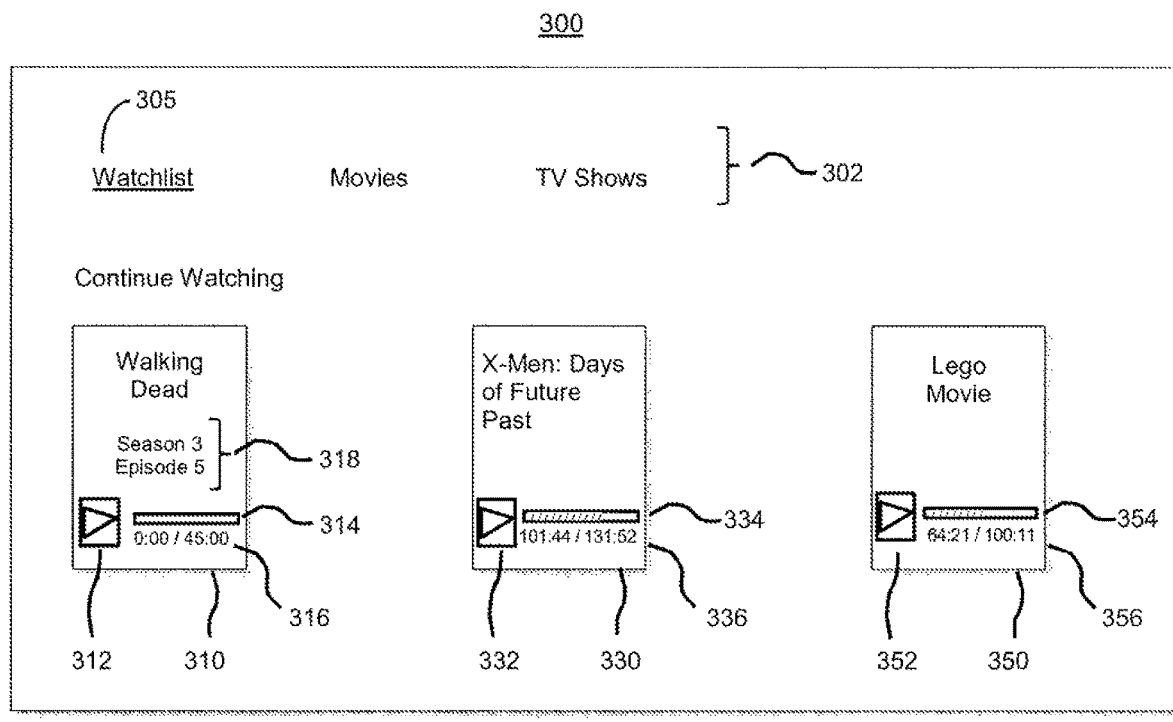
FIG. 3 illustrates an exemplary screen shot of an embodiment.

With reference to FIG. 3, an exemplary screen shot 300 is presented. FIG. 3 is merely exemplary and embodiments of the screen representation and menu system are not limited to the embodiments presented herein. The screen representation and menu system can be employed in many different embodiments or examples not specifically depicted or described herein. As an example, screen shot 300 can be shown on a screen of refreshing monitor 106 (FIG. 1).

Screen shot 300 shows a menu 302 with various available choices. Among the choices is watchlist 304, which can be configured to show the movies/TV shows available for this particular user. In screen shot 300, the user has selected watchlist 304, indicated by the underline under the choice. In some embodiments, other methods of notation can be used. For example, the chosen selection can be a different shade or a different color than the selections that were not chosen.

Three choices are shown to the user in boxes below menu 302. Boxes 310, 330, and 350 are available in this particular example. Box 310 represents the TV show, Walking Dead, at season 3, episode 5. Box 330 represents a movie: X-Men: Days of Future Past. Box 350 represents a movie: The Lego Movie. In some embodiments (such as the embodiment shown in FIG. 3) boxes 310, 330, and 350 can show the title of the movie or the TV show. In some embodiments, the boxes 310, 330, and 350 can also include a graphical representation that illustrates the content of the media, such as a movie poster or title graphics.

Within each of boxes 310, 330, and 350 are several design elements. The design elements illustrated in FIG. 3 are merely exemplary and other design elements are also possible. For example, buttons 312, 332, and 352 can serve as selection buttons such that, when the user selects those buttons, the corresponding media can begin or resume playback. Graphs 314, 334, and 354 are bar graphs illustrating how far into the media the user was when the user last viewed the media (the "viewed time"). Timers 316, 336, and 356 show that same data in textual format. In some embodiments, graphs 314, 334, and 354 and timers 316, 336, and 356 are both shown to the user. In some embodiments, only the graphs are shown. In some embodiments, only the timers are shown. Either the graphs or the timers can serve as visual representation of the viewed time. In some embodiment, the user can have the ability to choose which of the graph and timer are shown. While only three different media files are shown in FIG. 3, there can be more or fewer choices shown to the user.

In FIG. 3, it can be seen in timer 336 that the user stopped viewing X-Men: Days of Future Past at 101 minutes and 44 seconds into the movie, which is 131 minutes and 52 seconds long. While this data was shown in minutes and seconds, in some embodiments, the data can be shown as hours, minutes, and seconds (e.g., 1:41:44/2:11:52). The format of the text can be changed in some embodiments. Graph 334 is a visual representation of that data. Such a visual representation can be useful to a user to choose which media file to view. The user will be able to see that he is closer to the end of X-Men: Days of Future Past than he is with The Lego Movie. The user can use such information to choose which movie to view.

While the visual representation is shown as a horizontal bar graph 334, the visual representation can take a variety of different formats. In some embodiments, the visual representation can be a pie chart. In some embodiments, the visual representation can be a vertical bar graph. Other types of visual representation can also be used.

It can also be seen that the user stopped watching The Lego Movie at 64 minutes 21 seconds into the 100 minutes and 11 second movie. By activating button 352, the user signals to the streaming service provider that he/she wishes to resume playback of the Lego Movie at 64 minutes and 21 seconds into the movie.

This functionality can be provided even if the user is using a different device. For example, a user can begin watching a TV episode on a laptop computer, and then, the user can resume watching the same TV episode using a tablet. As another example, a user can begin watching a movie on a device attached to her living room TV, and after stopping the movie, the user can resume watching the same movie on their bedroom TV at the same point in the movie that she stopped watching in the living room.

The data shown in FIG. 3 can be presented in a variety of other manners. In some embodiments, a user is presented with a scrollable list of TV episodes or movies that he has been watching. In some embodiments, this list can be in a text format. In some embodiments, the list can be graphical, featuring graphical representations of the TV episodes or movies he has been watching (such as that illustrated in FIG. 3). The graphical representations can be in a variety of different forms. For example, the graphical representations can be graphical representations of the TV show or movie, such as an image of a poster.

In some embodiments, a user's progress through a TV series also can be displayed. Many TV shows are episodic and seasonal, showing a number of episodes of a TV show per year (otherwise known as a season, typically ranging from 13 to 24 shows per season). An embodiment can display to a user which episode the user last watched and/or what is the next episode to be watched. If the user had just finished episode 4 of a particular season of a TV show, such a fact can be indicated on the display. The ability to begin playback at the next episode of the TV show (episode 5 in this example), can also be present.

With reference to FIG. 3, such a situation is shown in box 310. Box 310 represents a TV show, The Walking Dead. Within box 310 is an indicator 318. Indicator 318 is used for TV shows to indicate the season and episode of a TV show. In FIG. 3, user had just finished viewing season 3, episode 4 of The Walking Dead. So the next episode (season 3, episode 5), is indicated by indicator 318.

In such a manner, the user can "binge watch" a series, watching many episodes in a relatively short amount of time, and have a representation of how many episodes the user has watched and/or how many episodes the user has left to watch.

A similar mechanism can be used for movies. Some movies are sequels to other movies. For example, the first movie in the Toy Story series was Toy Story. That movie was followed by Toy Story 2, and then by Toy Story 3. An embodiment can display Toy Story 3 as being available after the user finished watching Toy Story 2. In some embodiments, sequels to movies can be shown on a different screen than the watch list, such as a "suggested viewing" list.

In some embodiments, various subscription models can be used for the streaming service. In one embodiment, a user can pay a set amount of money per time period (such as a month), and be granted unlimited access to the streaming service for that time period. In some embodiments, a pay-per-movie or pay-per-show payment scheme can be used for the streaming service. In such a scheme, a user separately pays for each movie or each TV show that the user wishes to view. In some embodiments, elements of subscription and pay-per-show can be combined. In some embodiments, instead of paying separately for each episode of a TV show, a user can purchase an entire season of a TV show. In some embodiments, there can be different tiers of subscription services. A lower tier can grant the user access to certain TV shows and movies, but the user might be required to upgrade to a higher tier to access other TV shows and movies.

In some embodiments, a user can purchase an entire season of a TV show while it is being aired on broadcast TV. For example, as of the writing of this disclosure, the TV series Walking Dead is in its fifth season. The example shown in FIG. 3 is of a user who was watching the third season of Walking Dead. That user is able to watch all sixteen episodes of the third season without having to wait.

A user can purchase the entire fifth season of Walking Dead. However, because the fifth season has not aired yet, the user does not receive access to the next episode of the series until it airs on the network. In such a situation, a user can be informed on a watch-list screen that the next episode of Walking Dead is now available to that user.

In embodiments where elements of pay-per-movie or pay-per-show are used, an embodiment can show the next movie or episode in the series as being available for purchase. Thus, a user will not be granted access to the next movie or episode in the series unless the user pays for such access.

Figure 4:
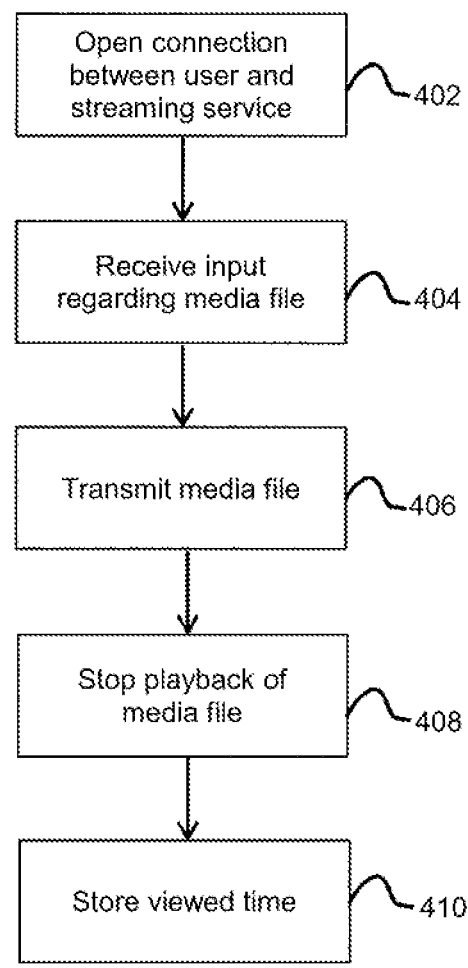
FIG. 4 is a flowchart illustrating the operation of an embodiment for tracking the viewed time of media files in an embodiment.

With reference to FIG. 4, a flowchart illustrating the operation of a method 400 of tracking the viewed time of media viewing is disclosed. Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, method 400 can be implemented by computer system 100 (FIG. 1).

A user opens a connection to a streaming service (block 402). Typically, this can be accomplished by a user logging in to the streaming service by entering his credentials (such as a user name and password). In some embodiments, such credentials can be saved such that the credentials do not have to be entered every time the user logs in.

The streaming service receives input from a user selecting a media file to view (block 404). This can be done in a variety of different manners, such as moving a cursor to a particular representation of the media file and pressing a specific key on a remote control. The streaming service transmits the selected media file to the user for playback to the user (block 406). The user later indicates a desire to stop playback of the media file (block 408). At this time, the streaming service stores information in a database regarding the media file, including which media file the user is watching and at what time the user stopped watching (the "viewed time") (block 410). Typically, while the media file is known by the movie title to the user, the database can use a unique identifier to represent the media file.

Figure 5:
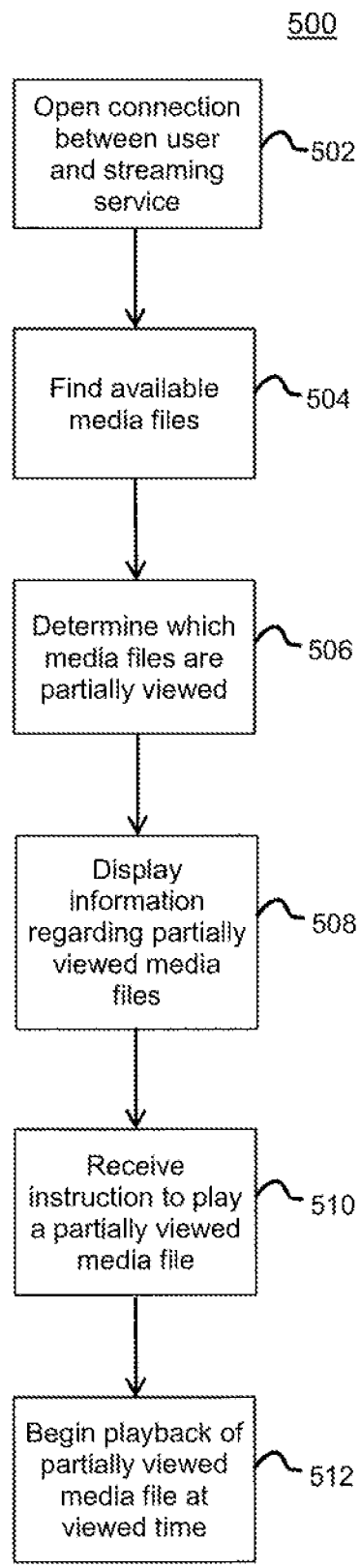
FIG. 5 is a flowchart illustrating the operation of an embodiment for displaying information regarding partially viewed media.

With reference to FIG. 5, a flowchart illustrating the operation of a method 500 of displaying the information regarding partially watched media. Method 500 is merely exemplary and is not limited to the embodiments presented herein. Method 500 can be employed in many different embodiments or examples not specifically depicted or described herein. In some embodiments, the procedures, the processes and/or the activities of method 500 can be performed in the order presented. In other embodiments, the procedures, the processes, and/or the activities of method 500 can be performed in any other suitable order. In still other embodiments, one or more of the procedures, the processes, and/or the activities of method 500 can be combined or skipped. In some embodiments, method 500 can be implemented by computer system 100 (FIG. 1).

A user opens a connection to a streaming service (block 502). Typically, this can be accomplished by a user logging in to the streaming service by entering his credentials (such as a user name and password). In some embodiments, such credentials can be saved such that the credentials do not have to be entered every time the user logs in.

The streaming service will access the user's account information to find available media files (block 504). As discussed, some embodiments might operate on a subscription model where the user has access to certain types of TV shows and movies, depending on the level of subscription. Some embodiments might have a free account, but the user has to pay for each movie and/or TV show. In such situations, the streaming service needs to determine which movies and TV shows are available to the user. Typically, such information is stored in some form of database. The streaming service will access the applicable database to determine which movies and TV shows (also known as media files) are available to the user.

The streaming service will then examine the available media files to determine which, if any, of the media files have been partially viewed by the user (block 506). A list can be created containing the partially viewed movie files. As described above with respect to FIG. 4, when a user only watches a portion of a movie or TV show, that fact can be stored in a database along with the viewed time (the time in the media file at which the user stopped playback).

As described above with respect to FIG. 3, box 310, some media files are part of a series of media files. A series of media files may be, for example, a TV series, which typically airs in seasons, with many episodes per seasons. In some embodiments, a series of movies can also comprise a series of media files, for example, the six movies of the Star Wars movie.

If a media file is a part of a series of media files, it can be treated differently in some respects, but not others. For example, if a media file is a part of a series of media files, but is partially viewed, it can be treated as above. However, if a media file is a part of a series of media files and has been viewed in its entirety, an embodiment can determine which media file is next in the series of media files. For example, if the user had finished watching season 3, episode 4 of The Walking Dead, then season 3, episode 5 of The Walking Dead can be denoted as the next media file in the series of media files. That next media file can then be placed in the list of partially viewed media files.

In some situations, there might be a newly available media file. A newly available media file can be a media file that was not available to the user the last time the user logged into the streaming system. As an example, a currently airing TV show can have an episode that was not previously available to the user. The newly available media file can be placed in the list of partially viewed media files.

Returning to FIG. 5, the streaming service can transmit for display information regarding the list of partially viewed media files (block 508). The information can be displayed in a variety of different manners. In some embodiments, the display can be similar to that shown in FIG. 3.

In some embodiments, a streaming service can allow pre-orders. That is, a user can purchase a movie or TV show even though the release date has not occurred. For example, the movie Dawn of the Planet of the Apes will be released on DVD on Dec. 2, 2014. That date can also be the date the movie becomes available on some streaming services. Prior to that date, a user can purchase the movie. Thereafter, when Dec. 2, 2014 passes, Dawn of the Planet of the Apes becomes available to be viewed. Because the user had previously purchased Dawn of the Planet of the Apes, that movie can become available to the user on or after Dec. 2, 2014. Since this is newly available content, the movie can be placed in the list of partially viewed media files.

In some embodiments, the list of partially viewed media files can be sorted. A variety of different sort orders can be used. In some embodiments, the list of partially viewed media files can be sorted such that the most recently viewed media file is displayed first. In some embodiments, newly available media files (such as new episodes of TV shows or pre-orders of movies), can be placed at the top of the list of partially viewed media files.

Returning to FIG. 5, the user might indicate the desire to watch a partially viewed media file (block 510). The streaming service will then transmit the partially viewed media file to the user (512). This transmission will begin playback of the partially viewed media file, starting at the viewed time of the selected media file. For example, if the user had stopped watching The Lego Movie at 64 minutes and 21 seconds into the movie, the playback will begin at approximately 64 minutes and 21 seconds into the movie.

Figure 6:
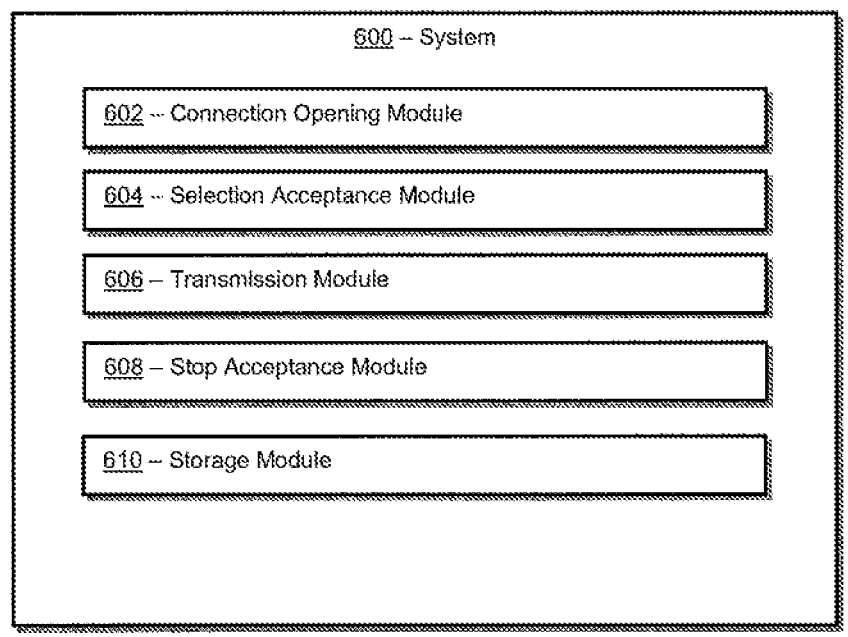
FIG. 6 is a block diagram illustrating an exemplary system for tracking the viewed time of media files in an embodiment.

Turning ahead in the figures, FIG. 6 illustrates a block diagram of a system 600 that is capable of performing disclosed embodiments. System 600 is merely exemplary and is not limited to the embodiments presented herein. System 600 can be employed in many different embodiments or examples not specifically depicted or described herein. In some embodiments, certain elements or modules of system 600 can perform various procedures, processes, and/or acts. In other embodiments, the procedures, processes, and/or acts can be performed by other suitable elements or modules.

In a number of embodiments, system 600 can include a connection opening module 602. In certain embodiments, connection opening module 602 can perform block 402 (FIG. 4) of opening a connection between a user and system 600.

Returning to FIG. 6, system 600 can include a selection acceptance module 604. In certain embodiments, selection acceptance module 604 can perform block 404 (FIG. 4) of accepting a selection of a media file to view.

Returning to FIG. 6, system 600 can include a transmission module 606. In certain embodiments, transmission module 606 can perform block 406 (FIG. 4) of transmitting a media file for playback.

Returning to FIG. 6, system 600 can include a stop acceptance module 608. In certain embodiments, stop acceptance module 608 can perform block 408 (FIG. 4) of receiving an indication to stop playback of a media file.

Returning to FIG. 6, system 600 can include a storage module 610. In certain embodiments, storage module 610 can perform block 410 (FIG. 4) of storing the viewed time of a media file.

Figure 7:
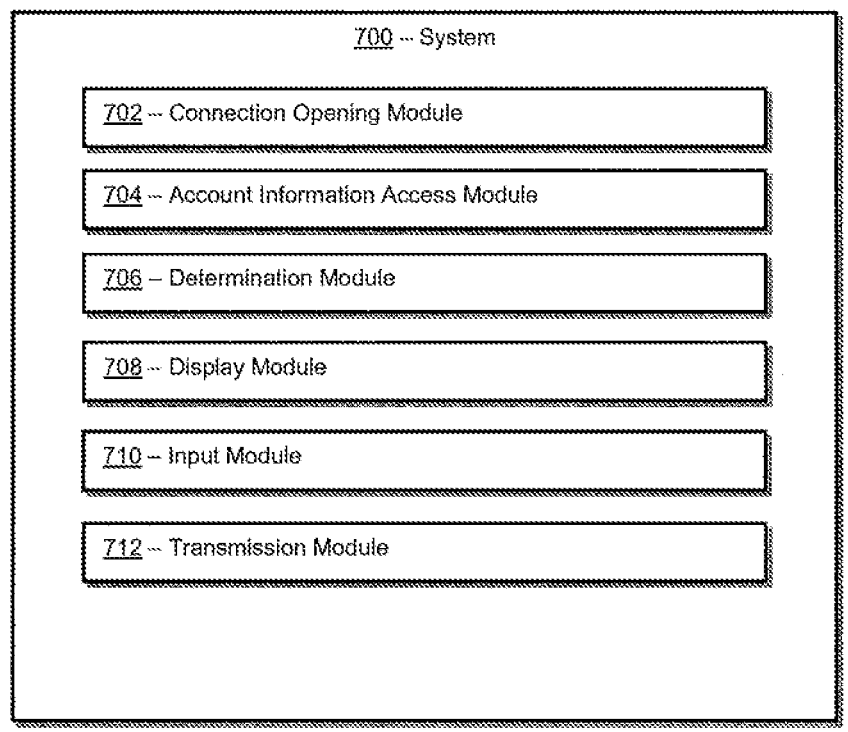
FIG. 7 is a block diagram illustrating an exemplary system for displaying information regarding partially viewed media.

Turning ahead in the figures, FIG. 7 illustrates a block diagram of a system 700 that is capable of performing disclosed embodiments. System 700 is merely exemplary and is not limited to the embodiments presented herein. System 700 can be employed in many different embodiments or examples not specifically depicted or described herein. In some embodiments, certain elements or modules of system 700 can perform various procedures, processes, and/or acts. In other embodiments, the procedures, processes, and/or acts can be performed by other suitable elements or modules.

In a number of embodiments, system 700 can include a connection opening module 702. In certain embodiments, connection opening module 702 can perform block 502 (FIG. 5) of opening a connection between a user and system 700.

Returning to FIG. 7, system 700 can include account information access module 704. In certain embodiments, account information access module 704 can perform block 504 (FIG. 5) of accessing account information of a user.

Returning to FIG. 7, system 700 can include determination module 706. In certain embodiments, determination module 706 can perform block 506 (FIG. 5) of determining which media files have been partially viewed by the user.

Returning to FIG. 7, system 700 can include display module 708. In certain embodiments, display module 708 can perform block 508 (FIG. 5) of displaying information regarding the list of partially viewed media files.

Returning to FIG. 7, system 700 can include input module 710. In certain embodiments, input module 710 can perform block 510 (FIG. 5) of accepting input from a user regarding the list of partially viewed media files.

Returning to FIG. 7, system 700 can include transmission module 712. In certain embodiments, transmission module 712 can perform block 512 (FIG. 5) of transmitting the partially viewed media file to the user.

Figure 8:
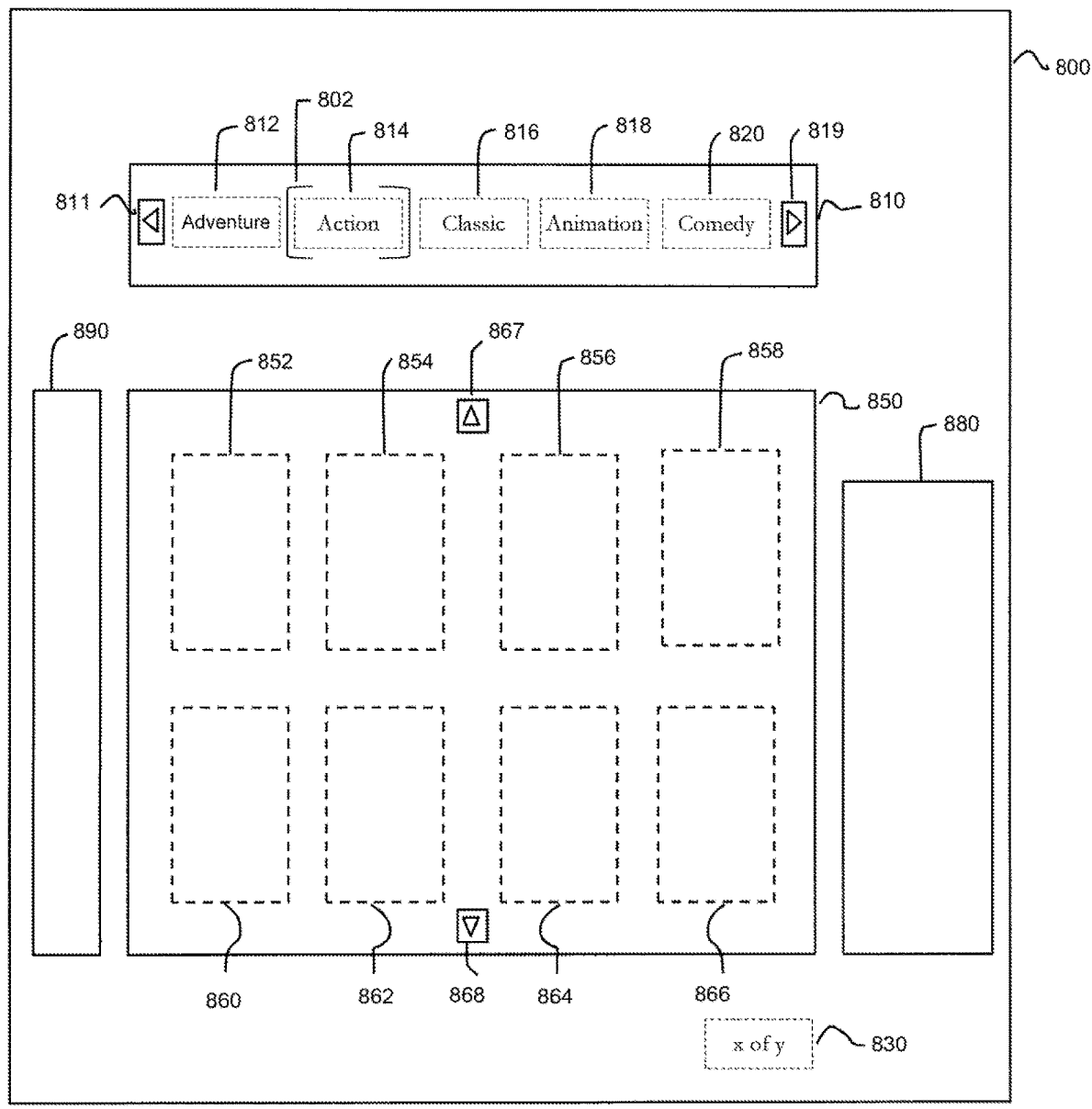
FIG. 8. illustrates an exemplary screen shot of an embodiment.

Turning ahead in the drawings, FIG. 8 is an example of a screen representation of a menu system of an embodiment. FIG. 8 is merely exemplary and embodiments of the screen representation and menu system are not limited to the embodiments presented herein. The screen representation and menu system can be employed in many different embodiments or examples not specifically depicted or described herein. In some embodiments, certain elements or modules of FIG. 8 can perform various procedures, processes, and/or activities. In other embodiments, the procedures, processes, and/or activities can be performed by other suitable elements or modules of FIG. 8.

The screen representation of FIG. 8 can be created by a system illustrated in FIGS. 1 and 2. Such a system can include, but is not limited to, a video game system, a set-top box, a personal computer (in either a desktop or a laptop form), an optical disc player, a smart TV, and the like. In some embodiments, the screen shown in FIG. 8 can be a web page shown in a browser. In some embodiments, the screen shown in FIG. 8 can be a page shown in an "app" of a tablet or smartphone. In some embodiments, the screen shown in FIG. 8 can be a page shown on a TV screen by a video game system, a set-top box, a personal computer (in either a desktop or a laptop form), an optical disc player, a smart TV, and the like.

Screen 800 comprises several display areas, including a first display area 810, a second display area 850, a third display area 880, a fourth display area 830, and a fifth display area 890.

First display area 810 can comprises a menu featuring a list of available categories 812, 814, 816, 818, and 820. In some embodiments, first display area 810 can be referred to as a ribbon area or a ribbon panel. In one embodiment, a home position can be the left-most position of first display area 810, e.g., the position used by available category 812 in FIG. 8. The remaining positions can be called secondary positions. In some embodiments, the list of available categories is scrollable. For example, although five categories are listed on a screen at any one time, there can be additional number of categories accessible through the use of navigation devices. There can be a navigation device at one or both sides of first display area 810 to allow a user to scroll through other available categories. Exemplary navigation devices can be arrow 811 and arrow 819. By accessing arrow 811 and 819, additional categories can be viewed. It should be understood that other types of navigation devices can be used, including, but not limited to, horizontal scroll bars, vertical scroll bars, and other visual indicia of the availability of additional content.

Also shown in FIG. 8 is a cursor 802. Cursor 802 can take one of a variety of different forms. As illustrated in FIG. 8, cursor 802 can take the form of a bracket that fits around one of categories 812, 814, 816, 818, and 820. It should be understood that cursor 802 is not so limited in form. Cursor 802 can be of a different color or different shade from a background color. Cursor 802 also can use a combination of tactics for visibility, such as the use of both brackets and coloring/shading. There can be other configurations of cursor 802, as long as a user is able to distinguish a category merely being displayed and a category being selected. In some embodiments, cursor 802 also can be moved from first display area 810 to other areas of the screen, such as second display area 850, third display area 880, fourth display area 830, and/or fifth display area 890.

Available categories 812, 814, 816, 818, and 820 can take a variety of different formats. For example, in an embodiment being used to view video content, each of available categories 812, 814, 816, 818, and 820 can be an available genre that is available to be viewed. Exemplary genres include labels such as adventure, animation, classic cinema, action, comedy, crime & thriller, documentary, drama, fantasy, musical, mystery, science fiction, and the like.

Within second display area 850 is a list of available content. In an embodiment, before a category in display area 810 is selected, second display area 850 can be configured to display a certain content as a default view, while displaying, in the first display area, the list of available categories. For example, in an embodiment used to display video content, the default view in the second display area can be popular movies. In another embodiment, the default view can be new movies. In another embodiment, the default view can be based on prior usage. For example, in some embodiments, a user of a system using an embodiment can have an account with a video content provider. Thus, the user can have a history associated with the system, where the history can comprise movies and or TV episodes that the user has viewed, rented, or purchased in the past. Thereafter, the default view can be configured such that "recommended" movies are shown in the second display area. The recommended movies can be based on the user's prior viewing history. Thus, a user who likes foreign movies might have a different default view than a user who watches a lot of science fiction movies.

In an embodiment, second display area 850 can be configured such that it only displays available content that is restricted by a category being selected by cursor 802. For example, in an embodiment used to display video content, if the cursor is on an "Action" genre in first display area 810, selections 852, 854, 856, 858, 860, 862, 864, and 866 can represent video content within the action genre, such as movies from the Transformers, James Bond, Batman, Expendables, the X-Men series, and the like.

Second display area 850 is configured such that, when one of selections 852, 854, 856, 858, 860, 862, 864, and 866 is selected by a user, the user is able to view and/or listen to the content. In an embodiment used for video content, as described above, each of selections 852, 854, 856, 858, 860, 862, 864, and 866 can represent a movie or TV episode. When the user moves cursor 802 over his chosen selection within second display area 850 and indicates his desire to view the movie through a particular action (such as pressing a particular switch on a remote control, video game controller, or touchscreen interface), an appropriate media file is then transmitted to the user. The appropriate media file is then played. An embodiment can facilitate the playing of the media file in one of a variety of different manners. In some embodiments, the media file is transmitted to a remote location. The remote location can be the device with which the user is accessing the embodiment. In some embodiments, the transmission can be a downloaded, such that the entire media file is transmitted before it is played. In some embodiments, the transmission can be streamed, such that playback of the media file can begin before the entire media file is transmitted to the user's media playback device. The transmission and playback of audio media files can be accomplished in a similar manner.

In an embodiment being used to select audio content, each of available categories 812, 814, 816, 818, and 820 can be an available musical genre that is available to be chosen. Exemplary genres can include labels such as classical, pop, jazz, rock, hip-hop, blues, electronic music, and the like. In such an embodiment, within second display area 850 is a list of available audio content that can be restricted by category. For example, if cursor 802 is on a "Classical" genre, selections 852, 854, 856, 858, 860, 862, 864, and 866 can be audio content within the Classical genre. For example, symphonies by Beethoven, concertos by Mozart, and operas by Wagner can make up selections 852, 854, 856, 858, 860, 862, 864, and 866. When cursor 802 is moved to a "Jazz" genre, the selections in second display area 850 can be changed to jazz artists, such as Miles Davis, John Coltrane, Spyro Gyra, and the like. In some embodiments, the changing of the second display area can occur whenever cursor 802 is moved to a different category or genre. In other embodiments, the changing of the second display area can occur after a user selects a category or genre.

In addition to genres, categories 812, 814, 816, 818, and 820, can take other forms. In one embodiment, each of categories 812, 814, 816, 818, and 820 can represent of list. The list can be any type of list. For example, the list could be the top 20 movies or music pieces for a particular week. The list could be movies that have been nominated for a particular award. The list could be musical pieces that have been nominated for a particular award. The list could be a compilation. For example, a list of movies that won a Best Picture Oscar or a list of movies listed in a particular organization's "Best of the Year" list. The list could be songs that reached number 1 on a chart any time in the 1990s. The list could be new releases for a particular month. The list could be by studio. For example, there could be a list for Disney animated movies, Pixar animated movies, Nickelodeon TV shows, CBS TV shows, and the like. The list could be by actor, such as a list featuring Robert De Niro movies or a list featuring Marlon Brando movies. The list could be by TV series, such as a list of Doctor Who episodes or Simpsons episodes. The list could be memorable sports moments, such as game-winning Super Bowl drives. The types of lists that could be generated for categories 812, 814, 816, 818, and 820 are not limited to those listed herein.

In some embodiments, while second display area 850 is shown in FIG. 8 as containing eight possible choices, there can be more or less than eight possible choices within the chosen category or sub-category or filter (described in more detail below). Therefore, it can be desirable for second display area 850 to be scrollable to allow a user to scroll through available selections in order to find the movie/TV show to view or audio selection to listen to. In some embodiments, second display area 850 contains a first navigation device 867 and a second navigation device 868. Navigation devices 867 and 868 can be configured to allow a user to scroll through available choices. For example, navigation devices 867 and 868 can be configured to appear as arrows to the user. In other embodiments, there is only one navigation device 867 present and it can be in the form of a scroll bar (vertical or horizontal). Other embodiments are also possible. In some embodiments, either navigation device 867 or 868 can be grayed-out or otherwise not accessible to a user in certain situations. For example, if there are no further selections (e.g., the user is at the top of the list of available selections or the bottom of the list of available selections or there are fewer available selections than there are spaces on the screen), the display can be configured such that the cursor cannot get to one or both of navigation device 867 or 868.

A user is able to navigate through the interface by moving cursor 802. In an embodiment, a user has access to a device that enables the movement of cursor 802. For example, a user can have a video game controller, such as a controller of the type used to control an Xbox 860, Xbox One, Playstation 3, Playstation 4 or Wii U. A user can have a remote control such as the type commonly used to control televisions and audio/video devices. These remote controls can control a device using infrared signals or can control a device using radio frequency (RF) signals. In an embodiment using a video game controller or in an embodiment using a remote control, a user can use arrow keys on the controller to change the on-screen location of cursor 802. Then the user can depress a select switch to make a particular selection.

When a user makes a selection, a variety of actions can occur. For example, the cursor might be within second display area 850 on one of selections 852, 854, 856, 858, 860, 862, 864, and 866 when the selection is made. In an embodiment being used to view video content, each of selections 852, 854, 856, 858, 860, 862, 864, and 866 could represent a movie or an episode of a television show. Thus, selecting one of 852, 854, 856, 858, 860, 862, 864, and 866 starts the chosen movie/episode. In an embodiment being used to select audio content, each of selections 852, 854, 856, 858, 860, 862, 864, and 866 could represent a song or album or "station" of the selected category.

If the cursor is within first display area 810 on one of categories 812, 814, 816, 818, or 820, the user can select the chosen category. Doing so can cause several things to happen. In one embodiment, the chosen category can move to the home position. For example, in one embodiment (as shown in FIG. 8), category 812 can be "Adventure", category 814 can be "Action", category 816 can be "Classic Cinema", category 818 can be "Animation", and category 820 can be "Comedy." If the user selects the category labeled "Action," the graphic for "Action" can be moved to the home position (the left-most position of first display area 810). Thereafter, the remaining categories can be replaced with sub-categories within the "Action" category. The list of available sub-categories is different from the first list of categories. There can be a variety of manners of displaying sub-categories for each category. For example, the sub-categories can represent the decade the movies were released in. So there could be a 1930s sub-category, a 1940s sub-category, a 1950s sub-category, and the like. In another example, the sub-categories can be for a movie series. So, within the "Action" category, there could be a "James Bond" sub-category, a "Transformers" sub-category, an "X-Men" sub-category, and the like. In another example, the sub-category can be an age range. So there could be an ages 5 and under category, an ages 6-9 category, an ages 10-13 category, and the like. In another embodiment, the sub-categories can be sub-genres within the chosen category. For example, within the "Action" category there can be types of action movies, such as "Blockbuster", "Apocalypse", "Chases", "Comedy", "Espionage", "Heists", and the like. Within each sub-category, there could be more sub-categories. For example, within the "Action" category and the "Comedy" sub-category, there could be additional sub-categories within the Action/Comedy sub-category. In some embodiments, the home position shows the chosen category while displaying, in the one or more secondary positions of the first display area, other categories from the list of categories.

It should be understood that, in an embodiment, it is possible for content to be available under more than one category/sub-category combination. For example, as described above with respect to an embodiment used to display video content, there can be a "Comedy" sub-category within an "Action" category. There also can be an "Action" sub-category within a "Comedy" category. In another example, there can be year based sub-categories within a Category. So a movie can be listed under a "1990s" sub-category under both "Action" and "Comedy. Or a movie can be listed under both "Children's" and "Animation." Or there can be studio-based categories. So a movie can be in a "Children's" category, an "Animation" category, and a "Pixar" category. The same can be true for an embodiment used to play audio content. A particular work (such as Beethoven's Fifth Piano Concerto) can be located in a "Beethoven" category, located in a "Classical" category, located in a "Piano" category, and located in a "Concerto" category.

Figure 10:
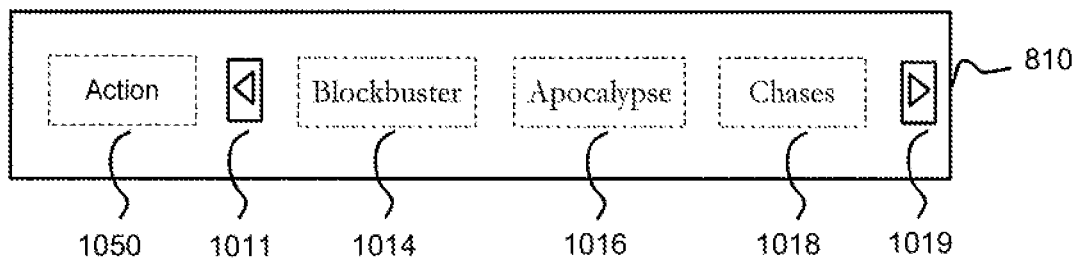
FIG. 10 illustrates an exemplary screen shot of a portion of the screenshot of FIG. 8.

With reference to FIG. 10, an illustration featuring first display area 810 is presented. In FIG. 8, first display area 810 is shown with broad categories. The cursor 802 is on category 814, "Action." FIG. 10 illustrates the result of first display area 810 after the "Action" category has been selected by a user. As described above, there can be a series of changes that occur when a category is selected by a user.

First display area 810 has changed to indicate to the user that a category has been selected. The selected category ("Action" in this example), has been moved to the home position 1050. The placement of the navigation devices has been changed to indicate that the available categories are within the category in the home position. In FIG. 10, navigation devices comprise arrow 1011 and 1019, but they can be replaced by any suitable navigation device that can be used to indicate the presence of additional choices to a user. The categories have been replaced by sub-categories such as sub-categories 1014 ("Blockbuster"), 1016 ("Apocalypse"), and 1018 ("Chases"). While only three sub-categories are shown in FIG. 10, it should be understood that any number of sub-categories can be shown in first display area 810.

In some embodiments, the sub-categories being displayed can be fixed. For example, in an embodiment used for audio content, selecting a "rock" category can always show the same sub-categories, e.g., "progressive rock," "punk rock," "soft rock," and the like. In other embodiments the sub-categories being displayed can be dynamically chosen based on various criteria. For example, a user's previous history can show that he likes "progressive rock," but almost never listens to "soft rock." Therefore, the next time this user selects the "rock" category, the "soft rock" category can be replaced with another category, but other sub-categories related to "progressive rock" can be displayed, such as "progressive metal" or "symphonic rock." In other embodiments, a user can be able to select or de-select certain categories to force them to be displayed or to prevent them from being displayed.

Returning to FIG. 8, in addition to the changes of first display area 810, before the user selected the Action category, second display area 850 can have been configured to show a default selection of movies, including movies in many different genres. After the user selected the Action category, the available selections in second display area 850 have been changed to show movies within the Action category.

The categories listed in first display area 810 can be a horizontal row of one or more buttons stating the categories such as Action, Animation, or Comedy. In some embodiments, the horizontal row of one or more buttons can be scrollable. In some embodiments, the buttons can be in the form of text labels. In one embodiment, the text labels are over a representation chosen to illustrate the category. The representation can be an illustration, a photo, an image, a thumbnail, etc. For example, Action could be illustrated by a picture of a Transformer. Animation could be a picture of Shrek. Comedy could be a picture from a Ben Stiller movie. Adventure could be a picture of Indiana Jones. Classic Cinema could be an image from Citizen Kane.

The selections within second display area 850 can be text labels for selections 852, 854, 856, 858, 860, 862, 864, and 866, stating the title of the movie, TV episode, or musical piece being selected. In one embodiment, the text labels can be replaced or augmented with a representation from the movie, TV, episode, or musical piece being selected. The representation can be an illustration, a photo, an image, a thumbnail, a recreation of a poster, and the like. For example, a movie poster representing the movie Toy Story 3 can be used in place of selection 852; and a movie poster representing the movie Brave can be used in place of selection 854.

There also can be a third display area 880. In one embodiment, third display area 880 can contain information about a currently highlighted selection. For example, in an embodiment used to display video content, if the user's cursor 802 is on a particular movie (one of selections 852, 854, 856, 858, 860, 862, 864, and 866), third display area 880 can display production information about the movie. Production information can include, but is not limited to, the year the movie was released, the actors in the movie, the director of the movie, the Motion Pictures Association of America ("MPAA") rating, a user rating indicating user reviews of the movie (such as an Internet Movie Database ("IMDb") rating), and a synopsis of the movie. Production information also can include information about how to access the movie. For example, in a subscription-based model, there can be different tiers of subscriptions. Thus, there can be information about whether or not the selected movie is within the user's subscription tier. In an embodiment where movies are purchased or rented, production information can include information about how to purchase or rent the particular movie. In such an embodiment, if a user had previously purchased the movie, the production information can reflect such a purchase and allow the user to view the movie again. Production information also can include information about format. For example, some movies could be available in a standard-definition version, a low-bandwidth high-definition version, a high-bandwidth high-definition version, a 3-D version, and an ultra-high definition (also known as "4K") version. The production information could be configured to show the user the available formats and the cost for each format. In some embodiments, the ability to play movies or TV episodes can be contained in third display area 880. Thus, the ability to rent a movie, purchase a movie, or play a movie can be in third display area 880.

When the user moves the cursor 802 to a new movie (e.g., a different one of selections 852, 854, 856, 858, 860, 862, 864, and 866), third display area 880 can be updated to show information about the newly selected movie. In such a manner, the user is able to view information about a movie, TV episode, or musical piece without obscuring other available choices within second display area 850.

In an embodiment used for audio content, production information can include information about a chosen musical piece. Such production information can include, but is not limited to, the year of release, a list musicians who performed on the piece, and other information about the musical piece. Such production information also can include information about how to purchase, rent, or otherwise access the chosen musical piece.

There also can be a fourth display area 830. In some embodiments, fourth display area 830 can be used to inform the user how many records match a selected criteria. For example, in an embodiment used for video content, fourth display area 830 might read "25,000 records," informing the user that there are 25,000 movies/TV episodes available for viewing. When the user selects a category corresponding to a genre by moving the cursor within the first display area 810, fourth display area 830 can be updated such that it shows the number of movies/TV episodes within that category. When a user further selects a sub-category, fourth display area 830 can update again to show an even smaller number of movies within the selected sub-category.

Figure 9:
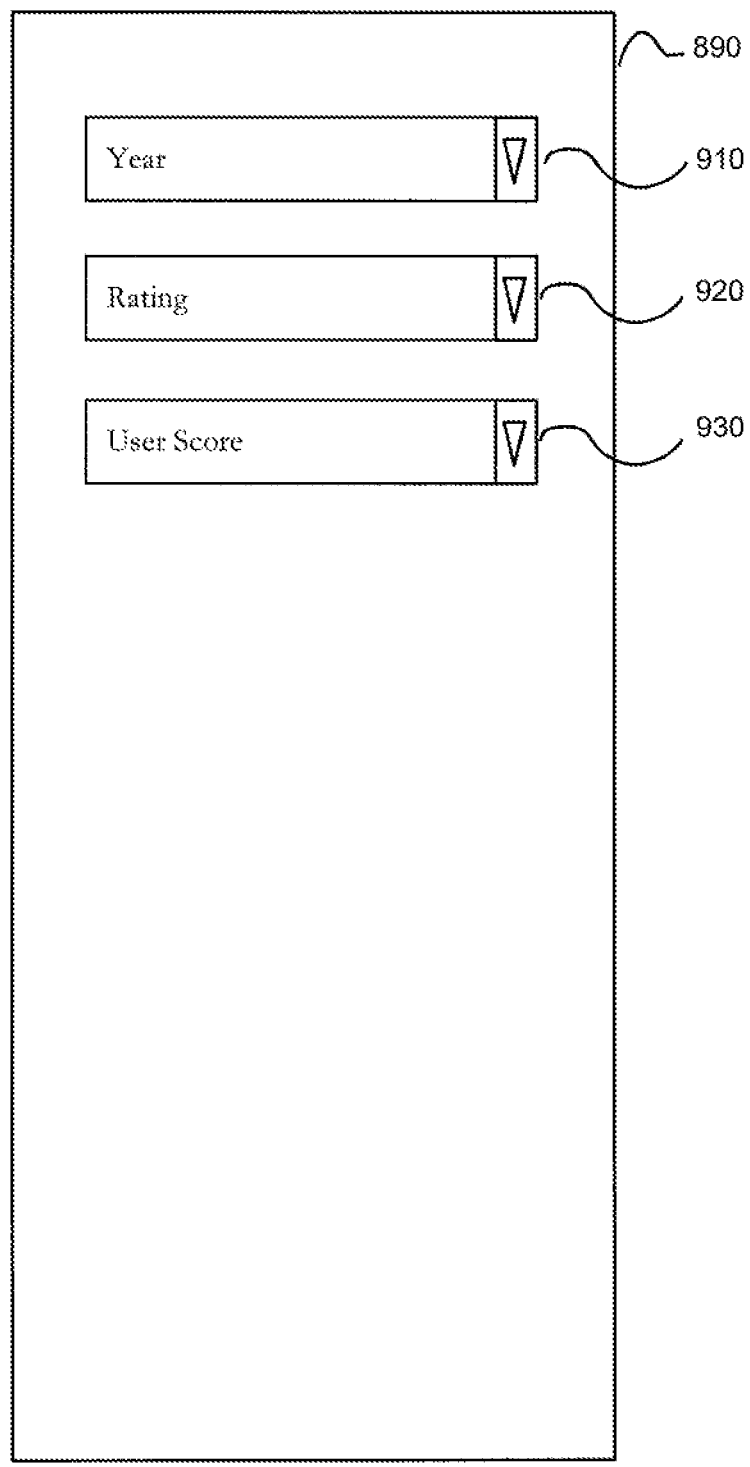
FIG. 9 illustrates an exemplary screen shot of a portion of the screenshot of FIG. 8.

There also can be a fifth display area 890. In some embodiments, fifth display area 890 can be used to allow the user to filter the available selections. With reference to FIG. 9, details of fifth display area 890 are shown in greater detail. Fifth display area 890 can comprise a series of drop-down boxes 910, 920, and 930. It should be understood that a greater number of drop-down boxes can be displayed. However, only three are shown in FIG. 9 for illustrative purposes. Drop-down box 910 is shown in FIG. 9 as allowing a user to select a year. For example, in an embodiment used to display video content, the user can select to view movies/TV episodes only after 1990 or only before 2010. In some embodiments, there can be more than one drop-down box for a year input to allow a user to select both a start year and an end year. Through these inputs, a user is able create a filter criteria and send the filter criteria to an embodiment.

When a user selects a year in drop-down box 910, the remainder of display 800 changes in reaction. For example, in an embodiment used for video content, fourth display area 830 can change to display the number of movies/TV episodes that meet the selected criteria. In one embodiment, second display area 850 changes according to the selected filter. For example, all movies/TV episodes that do not meet the selected criteria in drop-down box 910 is removed and replaced with movies/TV episodes that do meet the selected criteria.

Exemplary drop-down boxes 920 and 930 are also illustrated. Drop-down box 920 can contain a rating, such as a Motion Picture Association of America (MPAA) rating (e.g., G, PG, PG-13, and R). Thus, a user can create a filter such that only movies with the selected rating are shown in second display area 850. Drop-down box 930 can contain a user rating, such as that from the Internet Movie Database (IMDb). In such a manner, a user can create a filter such that only movies with a user score above a certain number are shown in second display area 850. It should be understood that, as each filter is made, fourth display area 830 also can change such that the number of movies/TV episodes that meet the filter criteria is shown.

It should be understood that multiple filters can be used simultaneously. For example, a user can select only movies from before 2010 with a "PG-13" rating, that has an IMDb score of at least 7.0.

It should be understood that year, rating, and user scores boxes shown in FIG. 9 are merely exemplary filters. Embodiments are not limited to filters in those categories. Other filters can be used in addition to those shown in FIG. 9. Other filters also can replace the filters shown in FIG. 9. Exemplary filters can include a filter by actor, by director, by studio.

In some embodiments, fifth display area 890 can present additional options to a user. For example, fifth display area 890 can provide a sort selector to give a user the ability to sort the available selections available in second display area 850. In an embodiment used to deliver video content, the user can sort the available selection in a variety of different manners, such as by year of release, by title, by user rating, by MPAA rating, and the like. The user also can have the ability to sort in an increasing manner (e.g., oldest selection first) or in decreasing manner (e.g., newest selection first). In some embodiments, a user is able to select a default sorting method such that selections are always sorted in a certain manner. In some embodiments, in the absence of a chosen sort order or user-selected default sort order, there can be a standard sort order. The standard sort order can choose which available selections are shown on a variety of criteria. Exemplary criteria can include popularity, date of release, or the presence of special promotions. For an example of special promotions, when one movie becomes newly available, previous movies in the series can become promoted such that the user is able to easily find all the movies in a series.

In some embodiments, fifth display area 890 is not always available. For example, if the chosen category or sub-category has a small number of selections, it may not be advantageous to allow a user to create a filter of the selections. In some embodiments, the number of selections that is used to determine if a fifth display area 890 is available is if there are more than 40 selections available. If there are 40 or fewer selections, the user should be able to scroll through the selections (using navigation devices 867 and 868, for example) without having to first limit the number of selections through the use of a filter. It should be understood that other embodiments can use a different number than 40 selections to determine when to show fifth display area 890.

Returning to FIG. 8, in some embodiments, one or more of first display area 810, second display area 850, third display area 880, fourth display area 830, and fifth display area 890 can be hidden from view when not in use. For example, third display area 880 can be configured such that it is only visible when a cursor is on one of selections 852, 854, 856, 858, 860, 862, 864, or 866. Therefore, when the cursor is in first display area 810 (selecting a category) or the cursor is in fifth display (creating a filter), third display area 880 can be hidden from view. In some embodiments, when third display area 880 is hidden from view, second display area 850 expands to occupy the space where display area 880 was located. In some embodiments, fifth display area 890 can be a small area that merely indicates the ability to create a filter. In such an embodiment, when a user selects fifth display area 890, fifth display area 890 can be configured to expand to allow a user to create a filter. In such an embodiment, one or more of the remaining display areas can be configured to shrink and/or move in response to the expanding of fifth display area 890.

It should be understood that, while each of first display area 810, second display area 850, third display area 880, fourth display area 830, and fifth display area 890 are displayed with borders, such a border might not be present in some embodiments. There can be other methods to differentiate between different areas of the screen. In some embodiments, different areas have different amounts of shading, such that first area 810, for example, has a lighter background than the rest of the screen. Colors also can be used to differentiate between different screen areas. In some embodiments, there might not be any differentiation between different screen areas.

It should be understood that the locations of first display area 810, second display area 850, third display area 880, fourth display area 830, and fifth display area 890 are merely exemplary. Other embodiments can have a different layout of the various screen elements. For example, in some embodiments, first display area 810 is located below second display area 850. In some embodiments fourth display area 830 is located within second display area 850. In some embodiments, fifth display area 890 can be to the right of second display area 850. Other layouts also can be used.

Filters in fifth display area 890 are also not limited to drop-down boxes. Any method of limiting the number of available selections can be used. For example, there can be an area for a user to enter a search criteria such that a user can type in, for example, the name of an actor, and the filter will work to include only movies in which the actor had a starring role.

Figure 11:
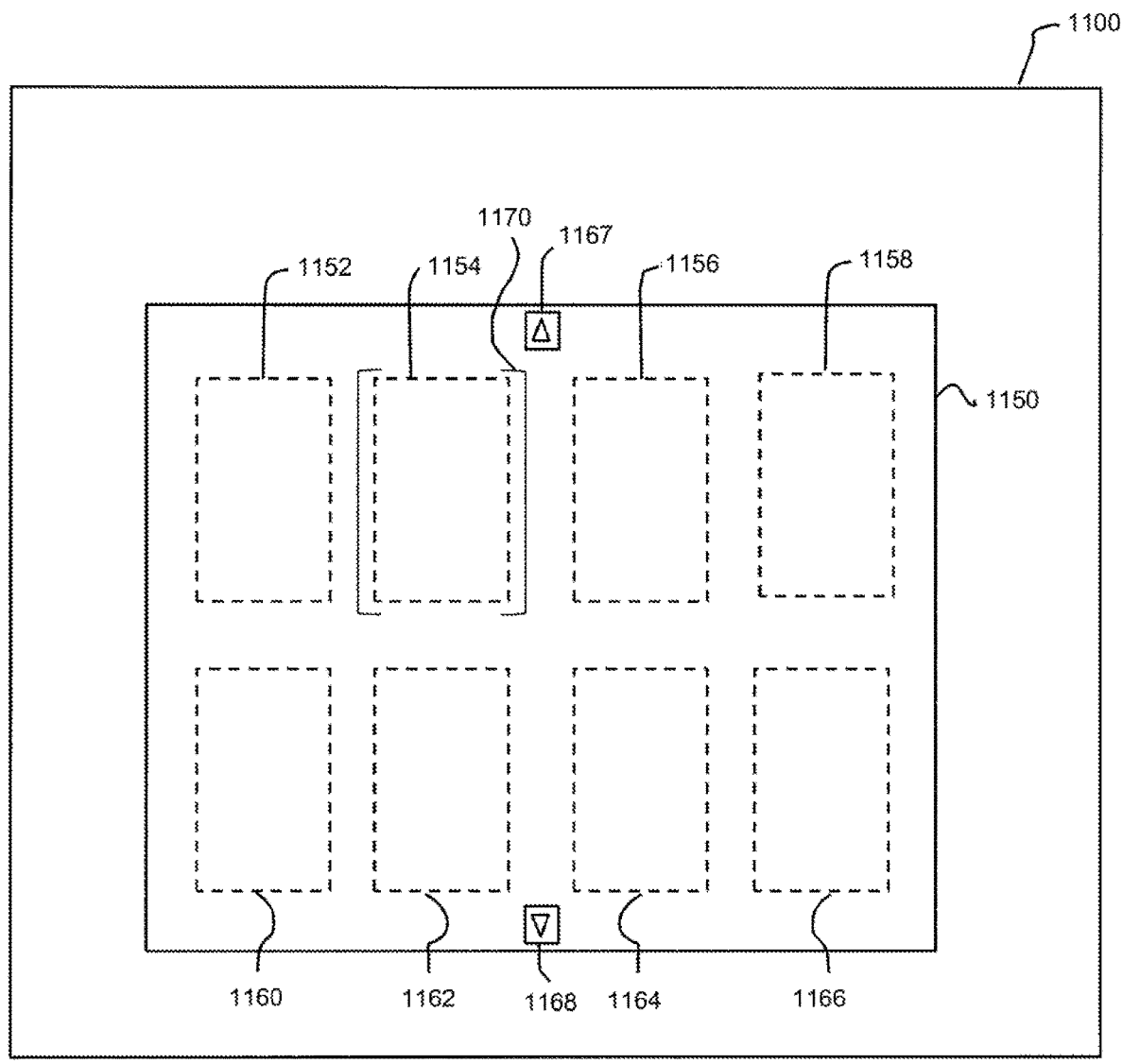
FIG. 11 illustrates an exemplary screen shot of an embodiment.

In some embodiments, a first display area might not be available to a user until the user has made a selection. With reference to FIG. 11, a screen representation of such an embodiment is presented. FIG. 11 is merely exemplary and embodiments of the screen representation are not limited to the embodiments presented herein. The screen representation can be employed in many different embodiments or examples not specifically depicted or described herein. In some embodiments, certain elements or modules can perform various procedures, processes, and/or activities. In other embodiments, the procedures and/or activities can be performed by other suitable elements or modules of FIG. 11.

FIG. 11 illustrates a screen 1100 comprising a second display area 1150, without a first display area. Within second display area 1150 are showcases 1152, 1154, 1156, 1158, 1160, 1162, 1164, and 1166. In some embodiments, second display area 1150 can be the only display area on screen 1100 until after a user selects a showcase.

A showcase can be a predetermined or dynamically created collection of related media. Exemplary showcases can be created to take advantage of various timings. For example, there can be a separate showcase for an upcoming holiday. Thus, there could be a Halloween-themed showcase available in October, a Thanksgiving-themed showcase available in November, and a Christmas-themed showcase available in December. Each of these showcases can feature various media related to the showcase theme. A Halloween-themed showcase could feature scary movies or scary music. A Christmas-themed showcase could feature Christmas movies. When baseball playoffs start, there could be a baseball-themed showcase featuring baseball movies and/or music. When football playoffs start, there could be a football-themed showcase. When the time for airing Academy Awards nears, there could be one or more Academy Award-themed showcases.

There also can be showcases that are based around studios. For example, there could be a Disney showcase featuring Disney animated movies. There could be a Dreamworks animation showcase. There could be a Nickelodeon showcase featuring many of the shows available on the Nickelodeon network. It should be understood that each showcase can have several sub-categories underneath. For example, after selecting the Nickelodeon showcase, a user could be presented with a different list of available showcases, each for various Nickelodeon shows, such as SpongeBob SquarePants, The Fairly OddParents, and The Penguins of Madagascar. Within each of those showcases, there could be additional showcases. For example, by selecting SpongeBob SquarePants, a user could be presented with yet another listing of additional showcases, each presenting a different season of the show.

A dynamically created showcase can feature media that is related to media that a user has previously shown interest in. For example, a user who has watched a lot of science documentaries can be shown showcases featuring other science documentaries. A user who watches a lot of musicals can be shown showcases featuring musicals.

In a manner similar to that described above with respect to FIG. 8, in an embodiment, there is a cursor 1170 visible to a user. Via a remote control, video game controller, touch screen, keyboard/mouse, and the like, a user is able to move cursor 1170 among the various showcases 1152, 1154, 1156, 1158, 1160, 1162, 1164, and 1166. In some embodiments, there can be one or more navigation devices such as navigation devices 1167 and 1168 to allow a user to scroll through a scrollable list of showcases. By activating navigation devices 1167 and/or 1168, a user can access additional showcases that were not previously visible.

When a user is interested in a showcase, the user can indicate his interest by placing the cursor on or over the desired showcase and activating a switch, such as a select button on a remote control. Doing so can have a variety of different effects. In some embodiments, another display area becomes visible.

Figure 12:
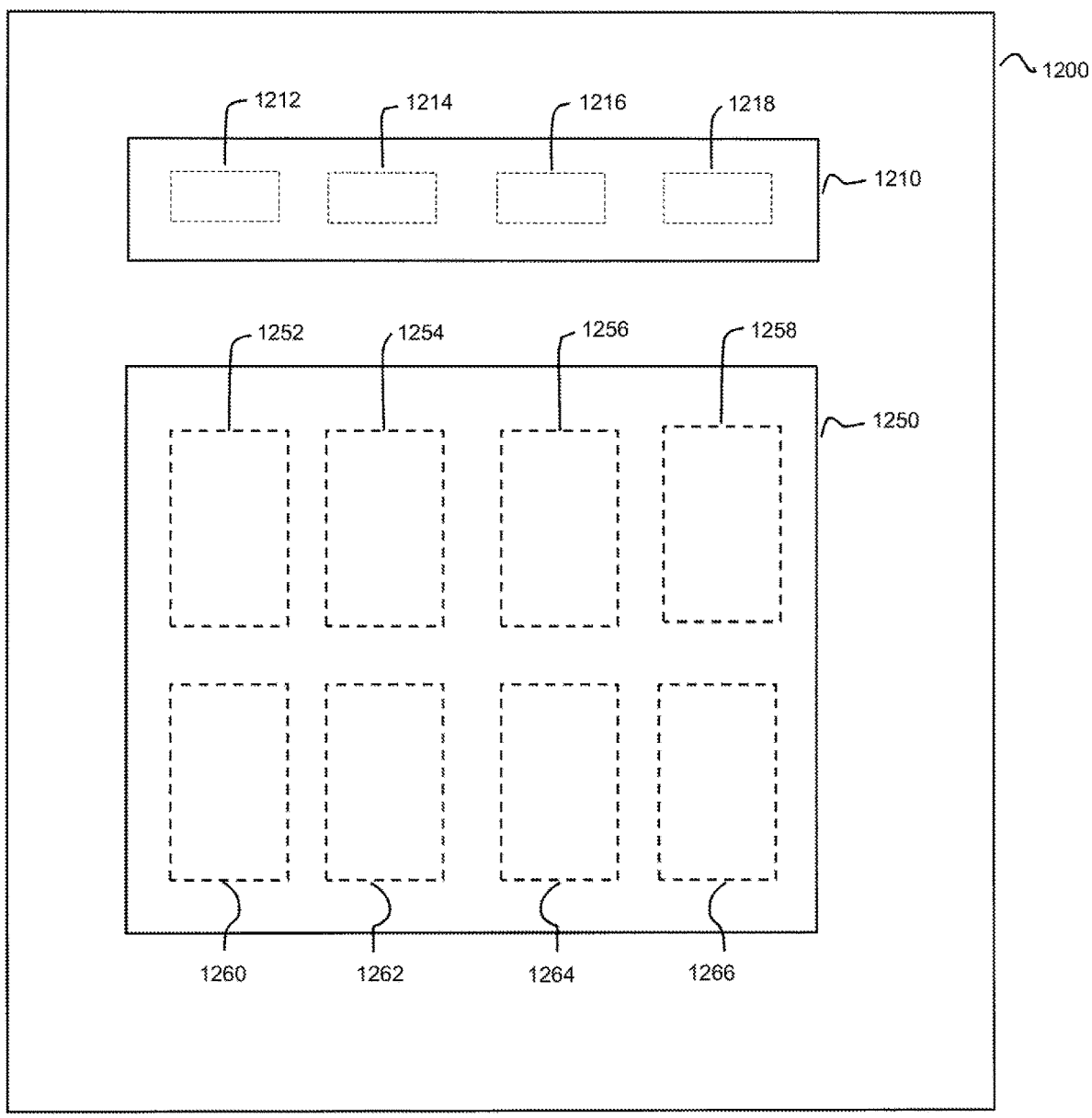
FIG. 12 illustrates an exemplary screen shot of an embodiment.

With reference to FIG. 12, a screen representation 1200 is presented after a user selects a showcase. FIG. 12 is merely exemplary and embodiments of the screen representation and menu system are not limited to the embodiments presented herein. The screen representation and menu system can be employed in many different embodiments or examples not specifically depicted or described herein. In some embodiments, certain elements or modules of FIG. 12 can perform various procedures, processes, and/or activities. In other embodiments, the procedures, processes, and/or activities can be performed by other suitable elements or modules of FIG. 12.

Similar to FIG. 11, there is a second display area 1250 in FIG. 12. More specifically, FIG. 12 illustrates a second display area 1250, which can contain selections 1252, 1254, 1256, 1258, 1260, 1260, 1262, 1264, and 1266. In addition to second display area 1250 is a first display area 1210. First display area 1210 can include categories 1212, 1214, 1216, and 1218. Similar to categories 812, 814, 816, 818, and 820 described above with reference to FIG. 8, categories 1212, 1214, 1216, and 1218 in FIG. 12 can take a variety of different forms, such as arrangements or genres. Also similar to category 812 in FIG. 8, category 1212 in FIG. 12 can be located at a home position. First display area 1210 in FIG. 12 also can have other features similar to first display area 810 in FIG. 8 such as navigation devices, etc.

Selections 1252, 1254, 1256, 1258, 1260, 1260, 1262, 1264, and 1266 in FIG. 12 can be available media to play (such as movies, TV episodes, or musical pieces). They also can be additional showcases, as described above. Selections 1252, 1254, 1256, 1258, 1260, 1260, 1262, 1264, and 1266 in FIG. 12 can be similar to selections 852, 854, 856, 858, 860, 860, 862, 864, and 866 in FIG. 12, and second display area 1250 in FIG. 12 can have other features similar to second display area 850 in FIG. 8

Although a third display area, a fourth display area, and a fifth display area (similar to those shown in FIG. 8) are not shown in FIG. 12, it should be understood that one or more such display areas can be present in certain embodiments.

Figure 13:
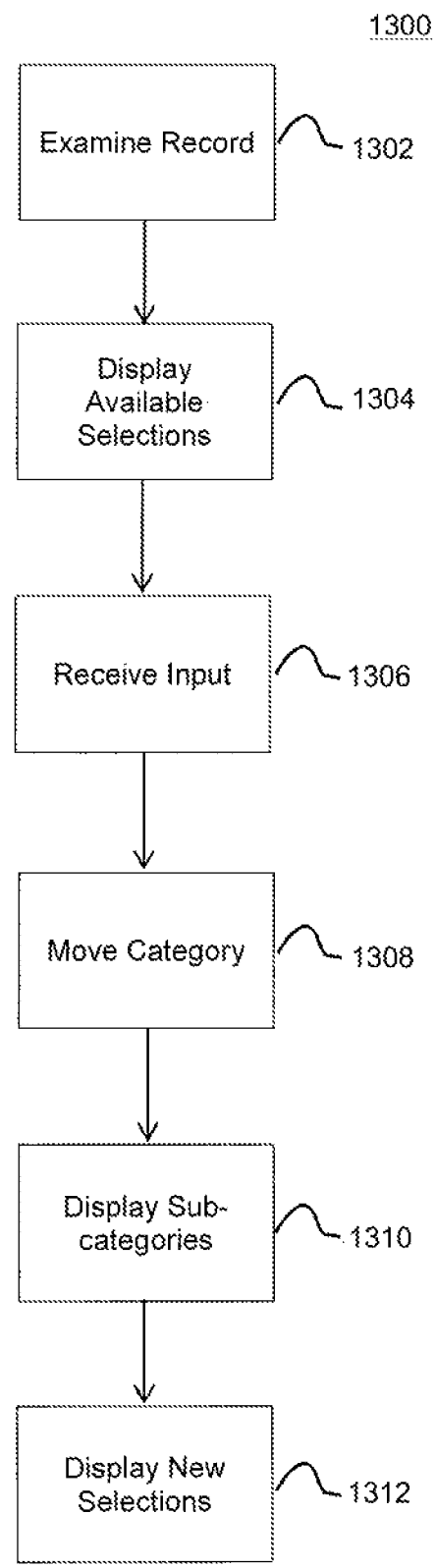
FIG. 13 illustrates a flow chart of a method to navigate a menu according to an embodiment.

Turning ahead in the figures, FIG. 13, a flow chart illustrating a method 1300 to navigate a menu according to an embodiment is presented. Method 1300 is merely exemplary and is not limited to the embodiments presented herein. Method 1300 can be employed in many different embodiments or examples not specifically depicted or described herein. In some embodiments, the procedures, the processes and/or the activities of method 1300 can be performed in the order presented. In other embodiments, the procedures, the processes, and/or the activities of method 1300 can be performed in any other suitable order. In still other embodiments, one or more of the procedures, the processes, and/or the activities of method 1300 can be combined or skipped. In some embodiments, method 1300 can be implemented by computer system 100 (FIG. 1).

The available categories can be displayed on a screen (block 1302). This listing can follow the format presented in FIG. 8, with a scrollable list of categories being presented in a first display area. Returning to FIG. 13, the available selections are displayed on a screen (block 1304). This displaying can follow the format presented in FIG. 8, with a list of available selections being presented in a second display area. Returning to FIG. 13, input can be received (block 1306). This can occur in a variety of different manners. For example, a user can indicate a selection by pressing a switch on a remote control or video game controller. When the user selects a category, the category is moved to a home position (block 1308). The sub-categories corresponding to the category are displayed (block 1310). Again, these listings can follow a format such as that set forth in FIG. 8 or other FIGs. For example, the sub-categories can be listed in the first display area next to the home position. Returning to FIG. 13, new selections are then displayed (block 1312). In an embodiment using the screen set forth in FIG. 8, the selections can be displayed in the second display area of the screen.

The sequence of the blocks in FIG. 13 can be re-arranged. For example, blocks 1302 and 1304 can be reversed or performed simultaneously with each other. As another example, blocks 1310 and 1312 can be reversed or performed simultaneously with each other. Other variations are also possible.

Figure 14:
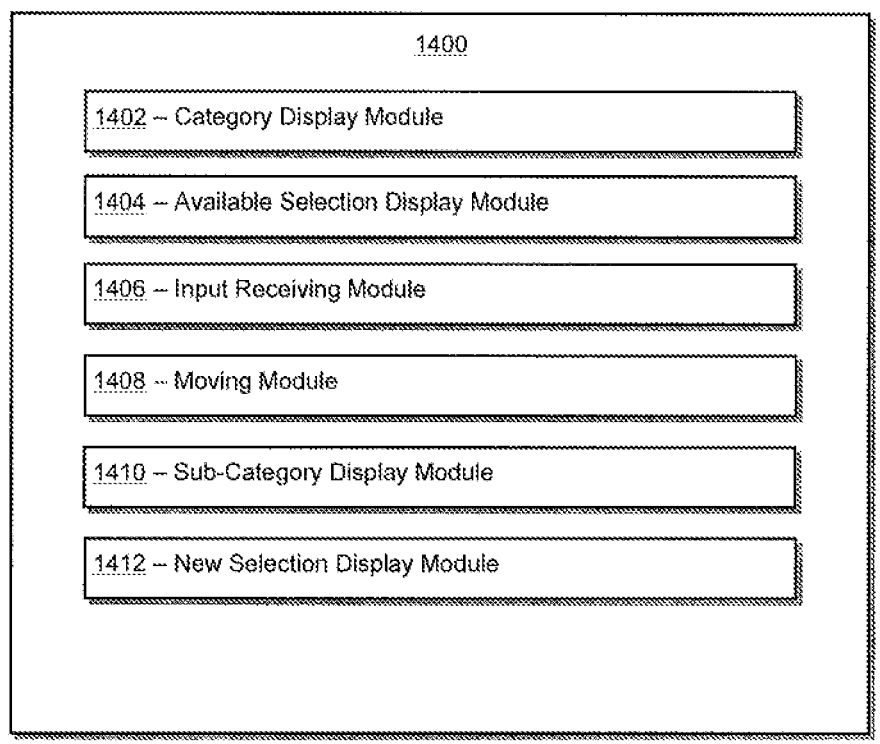
FIG. 14 illustrates a block diagram of a system for navigating a menu according an embodiment.

Turning ahead in the figures, FIG. 14 illustrates a block diagram of a system 1400 for navigating a menu according an embodiment. System 1400 is merely exemplary and is not limited to the embodiments presented herein. System 1400 can be employed in many different embodiments or examples not specifically depicted or described herein. In some embodiments, certain elements or modules of database system 1400 can perform various procedures, processes, and/or acts. In other embodiments, the procedures, processes, and/or acts can be performed by other suitable elements or modules.

In a number of embodiments, system 1400 can include a category display module 1402. In certain embodiments, display module 1402 can perform block 1302 (FIG. 13) of displaying available categories.

In a number of embodiments, system 1400 can include an available selection display module 1404. In certain embodiments, display module 1404 can perform block 1304 (FIG. 13) of displaying available selections.

In a number of embodiments, system 1400 can include an input receiving module 1406. In certain embodiments, input receiving module 1406 can perform block 1306 (FIG. 13) of receiving an input.

In a number of embodiments, system 1400 can include a moving module 1408. In certain embodiments, moving module 1408 can perform block 1308 (FIG. 13) of moving a chosen category to a certain place on a screen.

In a number of embodiments, system 1400 can include a sub-category display module 1410. In certain embodiments, display module 1410 can perform block 1310 (FIG. 13) of displaying available sub-categories.

In a number of embodiments, system 1400 can include a new selection display module 1412. In certain embodiments, display module 1412 can perform block 1312 (FIG. 13) of displaying a new list of selections.

Figure 15:
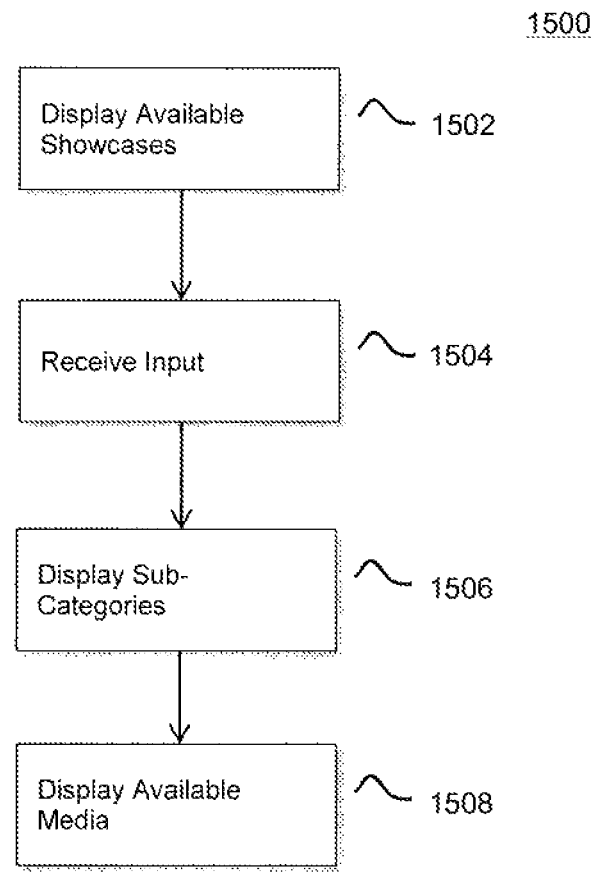
FIG. 15 illustrates a flow chart of a method to navigate a menu using showcases according to an embodiment.

Turning ahead in the figures, FIG. 15, a flow chart illustrating a method 1500 to navigate a menu according to an embodiment is presented. Method 1500 is merely exemplary and is not limited to the embodiments presented herein. Method 1500 can be employed in many different embodiments or examples not specifically depicted or described herein. In some embodiments, the procedures, the processes and/or the activities of method 1500 can be performed in the order presented. In other embodiments, the procedures, the processes, and/or the activities of method 1500 can be performed in any other suitable order. In still other embodiments, one or more of the procedures, the processes, and/or the activities of method 1500 can be combined or skipped. In some embodiments, method 1500 can be implemented by computer system 100 (FIG. 1).

The available showcases can be displayed on a screen (block 1502). This listing can follow the format presented in FIG. 11, with a scrollable list of showcase being presented in a second display area. When performing block 1502, the portion of the screen typically showing the first display area can be blank. Returning to FIG. 15, user input is received (block 1504). This can occur in a variety of different manners. For example, a user can indicate a selection by pressing a switch on a remote control or video game controller. The received input can indicate a selected showcase. Returning to FIG. 15, sub-categories are displayed (block 1506). This displaying can follow the format presented in FIG. 12, with a list of available sub-categories being presented in a first display area. Returning to FIG. 15, available media is displayed (block 1508). This displaying can follow the format presented in FIG. 12, with a list of available media being presented in a second display area. Thereafter, the steps presented with respect to FIG. 8 can be performed.

The sequence of the blocks in FIG. 15 can be re-arranged. For example, blocks 1506 and 1508 can be reversed or performed simultaneously with each other. Other variations are also possible.

Figure 16:
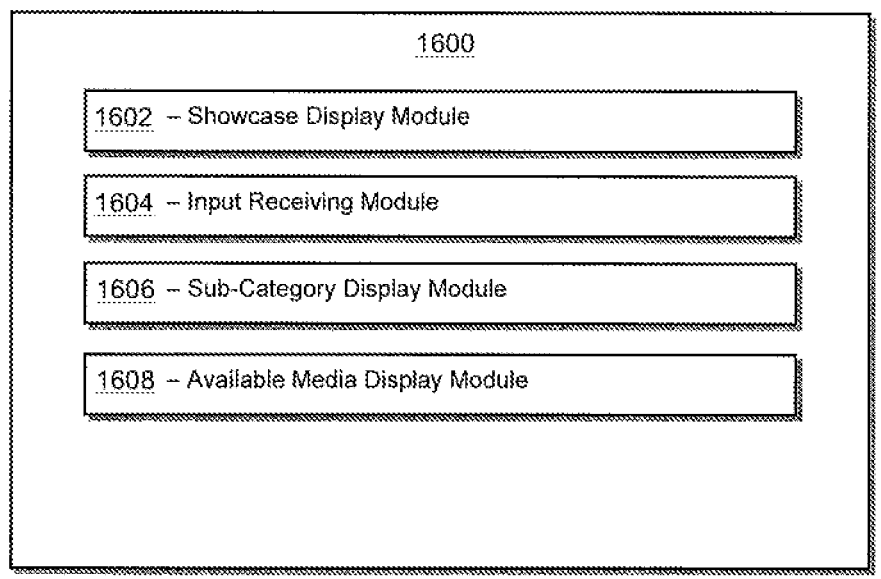
FIG. 16 illustrates a block diagram of a system for navigating a menu using showcases according an embodiment.

Turning ahead in the figures, FIG. 16 illustrates a block diagram of a system 1600 for navigating a menu according an embodiment. System 1600 is merely exemplary and is not limited to the embodiments presented herein. System 1600 can be employed in many different embodiments or examples not specifically depicted or described herein. In some embodiments, certain elements or modules of database system 1600 can perform various procedures, processes, and/or acts. In other embodiments, the procedures, processes, and/or acts can be performed by other suitable elements or modules.

In a number of embodiments, system 1600 can include a showcase display module 1602. In certain embodiments, showcase display module 1602 can perform block 1502 (FIG. 15) of displaying available showcases categories.

In a number of embodiments, system 1600 can include an input receiving module 1604. In certain embodiments, input receiving module 1604 can perform block 1504 (FIG. 15) of receiving user input.

In a number of embodiments, system 1600 can include sub-category display module 1606. In certain embodiments, sub-category display module 1606 can perform block 1506 (FIG. 15) of displaying sub-categories.

In a number of embodiments, system 1600 can include an available media display module 1608. In certain embodiments, available media display module 1608 can perform block 1508 (FIG. 15) of displaying available media.

Via a ribbon panel, users can navigate across movie/TV genre panels. From there, the user can select sub-genre panels, to filter and find their desired content quickly and easily. The navigation filters from genre to sub-genre to content choices in a seamless manner, allowing the user to remain on a specific screen and allow the user to navigate without the need for excessive movement.

The motion language can consist of clicking on a genre panel, and having the selected genre panel move to the left, while the other genre panels fade away. Related sub-genre panels then fade-up, available for selection, based on the user's choice. These sub-genre panels filter down to a narrow sub-set of results, in line with the user's selections. The visual language includes an iconic image, treated in a desaturated image style that is relevant to the genre or sub-genre category.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-16 can be modified, and that the foregoing discussion of certain of these embodiments does not necessarily represent a complete description of all possible embodiments. For example, one or more of the procedures, processes, or activities of FIGS. 1-16 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:

receiving a log-in request from a user of a first device;

accessing account information of the user to find available media files for the user;

determining when any of the available media files for the user were partially viewed on a second display associated with a second device to form a list of one or more partially viewed media files;

transmitting first instructions to display a menu on a first display associated with the first device, wherein:

the menu comprises a first display area and a second display area;

the first display area is present, but has a list of available categories, a home position, and one or more secondary positions hidden from view in the first display area;

the second display area comprises:

a list of available media selections comprising popular media selections, new media selections, recommended media selections, and partially viewed media selections;

the partially viewed media selections comprise:

information regarding at least one partially viewed media file from the list of one or more partially viewed media files;

the information regarding the at least one partially viewed media file comprises, for each respective partially viewed media file of the at least one partially viewed media files from the list of one or more partially viewed media files:

a respective title;

a respective viewed time; and a respective box; and the respective box for each respective partially viewed media file comprises:

(1) a respective graphical representation of the respective partially viewed media file;

(2) a respective playback selection button; and (3) adjacent the respective playback selection button, a respective visual representation of the respective viewed time for the respective partially viewed media file;

receiving, from the user, second instructions to display menu items in the first display area;

in response to receiving, from the user, the second instructions to display the menu items in the first display area:

automatically transmitting instructions to exit out of the second display area, thereby causing the information regarding the at least one partially viewed media file and the respective box for each respective partially viewed media file of the at least one partially viewed media file to be hidden from view in the second display area; and automatically transmitting third instructions to display, in the first display area, the list of available categories corresponding to the available media files for the user, wherein the first display area comprises the home position and the one or more secondary positions, the one or more secondary positions comprising the list of available categories;

receiving, from the user, a first selection of a category of the list of available categories;

in response to receiving the first selection of the category of the list of available categories from the user:

automatically transmitting fourth instructions to display the category in the home position of the first display area;

automatically transmitting instructions to replace the list of available categories in the one or more secondary positions of the first display area with a list of available media sub-categories corresponding to the first selection of the category; and automatically transmitting fifth instructions to display, in the second display area, media files of the available media files corresponding to the first selection of the category, the media files of the available media files corresponding to the first selection of the category comprising the at least one partially viewed media file;

receiving, from the user, a second selection of the playback selection button for a selected one of the at least one partially viewed media file, the second selection of the playback selection button received from the user indicating a request to watch the selected one of the at least one partially viewed media file on the first display associated with the first device; and transmitting sixth instructions to display the selected one of the at least one partially viewed media file on the first device in such a manner as to result in playback of the selected one of the at least one partially viewed media file starting at the respective viewed time of the selected one of the at least one partially viewed media file, selected via the second selection of the playback selection button, on the first display associated with the first device.

2. The method of claim 1 further comprising:

determining when any of the available media files are part of a series of media files;

in response to determining when any of the available media files are part of the series of media files, determining which media file of the series of media files was most recently viewed by the user on (1) the first display associated with the first device or (2) the second display associated with the second device; and placing a next media file in the series of media files in the list of one or more partially viewed media files for display in the menu on the first display associated with the first device when any of the available media files are determined to be part of the series of media files.

3. The method of claim 1 further comprising:

determining when any of the available media files are part of a series of media files;

in response to determining when any of the available media files are part of the series of media files, determining when there exists a newly available media file that is part of the series of media files; and placing the newly available media file in the series of media files in the list of one or more partially viewed media files for display in the menu on the first display associated with the first device when any of the available media files are determined to be part of the series of media files.

4. The method of claim 1 further comprising:

determining when any of the available media files are a newly available media file within a series of media files; and placing the newly available media file within the series of media files in the list of one or more partially viewed media files for display in the menu on the first display associated with the first device when any of the available media files are determined to be the newly available media file within the series of media files.

5. The method of claim 1 further comprising:
sorting the list of one or more partially viewed media files in order of most recently viewed by the user, wherein:
transmitting the first instructions to display the menu on the first display associated with the first device further comprises coordinating displaying the information, as sorted, in the order of most recently viewed by the user in the menu on the first display associated with the first device.

6. The method of claim 5, wherein:
sorting the list of one or more partially viewed media files in the order of most recently viewed by the user further comprises:
placing newly available media before most recently viewed media on the first display associated with the first device.

7. The method of claim 1, further comprising:
determining when any of the available media files are a newly available media file that is available for purchase within a series of media files; and
placing the newly available media file that is available for purchase in the series of media files in the list of one or more partially viewed media files for display in the menu on the first display associated with the first device when any of the available media files are determined to be the newly available media file that is available for purchase within the series of media files.

8. The method of claim 1, further comprising:
sorting the list of one or more partially viewed media files in order of most recently viewed by the user;
placing newly available media files before most recently viewed media files on the first display associated with the first device;
coordinating displaying the list of one or more partially view media files, as sorted in order of most recently viewed by the user, in the menu on the first display associated with the first device;
determining when any of the available media files are part of a series of media files;
when any of the available media files are determined to be part of the series of media files, determining at least one of:
which media file of the series of media files was most recently viewed by the user on (1) the first display associated with the first device or (2) the second display associated with the second device; and
whether there exists a first newly available media file that is part of the series of media files when any of the available media files is determined to be part of the series of media files;
when any of the available media files is determined to be part of the series of media files, placing a next media file in the series of media files in the list of one or more partially viewed media files for display in the menu on the first display associated with the first device;
when any of the available media files are determined to be part of the series of media files, placing the first newly available media file in the series of media files in the list of one or more partially viewed media files for display in the menu on the first display associated with the first device;
determining when any of the available media files are a second newly available media file that is available for purchase within a series of media files; and
when any of the available media files are determined to be the second newly available media file that is available for purchase within the series of media files, placing the second newly available media file that is available for purchase in the series of media files in the list of one or more partially viewed media files for display in the menu on the first display associated with the first device.

9. A system comprising:
one or more processors; and
one or more non-transitory computer-readable media storing computing instructions configured to run on the one or more processors and perform acts of:
receiving a log-in request from a user of a first device;
accessing account information of the user to find available media files for the user;
determining when any of the available media files for the user were partially viewed on a second display associated with a second device to form a list of one or more partially viewed media files;
transmitting first instructions to display a menu on a first display associated with the first device, wherein:
the menu comprises a first display area and a second display area;
the first display area is present, but has a list of available categories, a home position, and one or more secondary positions hidden from view in the first display area;
the second display area comprises:
a list of available media selections comprising popular media selections, new media selections, recommended media selections, and partially viewed media selections;
the partially viewed media selections comprise:
information regarding at least one partially viewed media file from the list of one or more partially viewed media files;
the information regarding the at least one partially viewed media file comprises, for each respective partially viewed media file of the at least one partially viewed media files from the list of one or more partially viewed media files:
a respective title;
a respective viewed time; and
a respective box; and
the respective box for each respective partially viewed media file comprises:
(1) a respective graphical representation of the respective partially viewed media file;
(2) a respective playback selection button; and
(3) adjacent the respective playback selection button, a respective visual representation of the respective viewed time for the respective partially viewed media file;
receiving, from the user, second instructions to display menu items in the first display area;
in response to receiving, from the user, the second instructions to display the menu items in the first display area:
automatically transmitting instructions to exit out of the second display area, thereby causing the information regarding the at least one partially viewed media file and the respective box for each respective partially viewed media file of the at least one partially viewed media file to be hidden from view in the second display area; and automatically transmitting third instructions to display, in the first display area, the list of available categories corresponding to the available media files for the user, wherein the first display area comprises the home position and the one or more secondary positions, the one or more secondary positions comprising the list of available categories;

receiving, from the user, a first selection of a category of the list of available categories;

in response to receiving the first selection of the category of the list of available categories from the user:
automatically transmitting fourth instructions to display the category in the home position of the first display area;
automatically transmitting instructions to replace the list of available categories in the one or more secondary positions of the first display area with a list of available media sub-categories corresponding to the first selection of the category; and
automatically transmitting fifth instructions to display, in the second display area, media files of the available media files corresponding to the first selection of the category, the media files of the available media files corresponding to the first selection of the category comprising the at least one partially viewed media file;

receiving, from the user, a second selection of the playback selection button for a selected one of the at least one partially viewed media file, the second selection of the playback selection button received from the user indicating a request to watch the selected one of the at least one partially viewed media file on the first display associated with the first device; and transmitting sixth instructions to display the selected one of the at least one partially viewed media file on the first device in such a manner as to result in playback of the selected one of the at least one partially viewed media file starting at the respective viewed time of the selected one of the at least one partially viewed media file, selected via the second selection of the playback selection button, on the first display associated with the first device.

10. The system of claim 9, wherein the computing instructions further comprise:
determining when any of the available media files are part of a series of media files;
in response to determining when any of the available media files are part of the series of media files, determining which media file of the series of media files was most recently viewed by the user on (1) the first display associated with the first device or (2) the second display associated with the second device; and
placing a next media file in the series of media files in the list of one or more partially viewed media files for display in the menu on the first display associated with the first device when any of the available media files are determined to be part of the series of media files.

11. The system of claim 9, wherein the computing instructions further comprise:
determining when any of the available media files are part of a series of media files;
in response to determining when any of the available media files are part of the series of media files, determining when there exists a newly available media file that is part of the series of media files; and
placing the newly available media file in the series of media files in the list of one or more partially viewed media files for display in the menu on the first display associated with the first device when any of the available media files are determined to be part of the series of media files.

12. The system of claim 9, wherein the computing instructions further comprise:
determining when any of the available media files are a newly available media file within a series of media files; and
placing the newly available media file within the series of media files in the list of one or more partially viewed media files for display in the menu on the first display associated with the first device when any of the available media files are determined to be the newly available media file within the series of media files.

13. The system of claim 9, wherein the computing instructions further comprise:
sorting the list of one or more partially viewed media files in order of most recently viewed by the user, wherein:
transmitting the first instructions to display the menu on the first display associated with the first device further comprises coordinating displaying the information, as sorted, in the order of most recently viewed by the user in the menu on the first display associated with the first device.

14. The system of claim 13, wherein:
sorting the list of one or more partially viewed media files in the order of most recently viewed by the user further comprises:
placing newly available media before most recently viewed media on the first display associated with the first device.

15. The system of claim 9, wherein the computing instructions further comprise:
determining when any of the available media files are a newly available media file that is available for purchase within a series of media files; and
placing the newly available media file that is available for purchase in the series of media files in the list of one or more partially viewed media files for display in the menu on the first display associated with the first device when any of the available media files are determined to be the newly available media file that is available for purchase within the series of media files.

16. The system of claim 9, wherein the computing instructions further comprise:
sorting the list of one or more partially viewed media files in order of most recently viewed by the user;
placing newly available media files before most recently viewed media files on the first display associated with the first device;
coordinating displaying the list of one or more partially view media files, as sorted in order of most recently viewed by the user, in the menu on the first display associated with the first device;
determining when any of the available media files are part of a series of media files;
when any of the available media files are determined to be part of the series of media files, determining at least one of:
which media file of the series of media files was most recently viewed by the user on (1) the first display associated with the first device or (2) the second display associated with the second device; and whether there exists a first newly available media file that is part of the series of media files when any of the available media files is determined to be part of the series of media files;

when any of the available media files are determined to be part of the series of media files, placing a next media file in the series of media files in the list of one or more partially viewed media files for display in the menu on the first display associated with the first device;

when any of the available media files are determined to be part of the series of media files, placing the first newly available media file in the series of media files in the list of one or more partially viewed media files for display in the menu on the first display associated with the first device;

determining when any of the available media files are a second newly available media file that is available for purchase within a series of media files; and when any of the available media files are determined to be the second newly available media file that is available for purchase within the series of media files, placing the second newly available media file that is available for purchase in the series of media files in the list of one or more partially viewed media files for display in the menu on the first display associated with the first device.

17. The system of claim 9, wherein the computing instructions further comprise:

receiving, from the user, a third selection of a media sub-category of the available media sub-categories, wherein the available media sub categories are dynamically generated based on a previous history of one or more media sub-category selections of the user; and in response to receiving the third selection of the media sub-category of the available media sub-categories:

automatically transmitting instructions to replace the media files of the available media files corresponding to the first selection of the category of the list of available categories in the second display area with media files of the available media files corresponding to the third selection of the media sub-category of the available media sub-categories, the media files of the available media files corresponding to the third selection of the media sub-category comprising the at least one partially viewed media file.

18. The system of claim 9, wherein the computing instructions further comprise:

in response to automatically transmitting the instructions to exit out of the second display area:

transmitting instructions to automatically expand the first display area; and transmitting instructions to automatically shrink the second display area.

19. A method comprising:

receiving a log-in request from a user of a first device;

accessing account information of the user to find available media files for the user;

receiving a first selection from the user indicating a request to watch a selected media file of the available media files;

transmitting the selected media file to the user in such a manner as to result in playback of the selected media file on a first display associated with the first device;

receiving an indication from the user to stop the playback of the selected media file on the first display associated with the first device at a viewed time;

storing the viewed time of the selected media file with the account information of the user for playback of the selected media file at the viewed time on (1) the first display associated with the first device or (2) a second display associated with a second device;

transmitting first instructions to display a menu on one of (1) the first display associated with the first device or (2) the second display associated with the second device, wherein:

the menu comprises a first display area and a second display area;

the first display area is present, but has a list of available categories, a home position, and one or more secondary positions hidden from view in the first display area;

the second display area comprises:

a list of available media selections comprising popular media selections, new media selections, recommended media selections, and partially viewed media selections;

the partially viewed media selections comprise:

media information regarding the selected media file comprising a title of the selected media file and the viewed time of the selected media file; and a box for each respective partially viewed media selection of the partially viewed media selections from the list of available media files; and the box for each respective partially viewed media selection of the partially viewed media selections from the list of available media files comprises:

(1) a respective graphical representation of the partially viewed media selection;

(2) a respective playback selection button; and (3) adjacent the respective playback selection button, a visual representation of the viewed time for the partially viewed media selection;

receiving, from the user, second instructions to display menu items in the first display area;

in response to receiving, from the user, the second instructions to display the menu items in the first display area:

automatically transmitting instructions to exit out of the second display area, thereby causing the media information regarding selected media file and the box for each respective partially viewed media selection of the at least one partially viewed media selections to be hidden from view in the second display area; and automatically transmitting third instructions to display, in the first display area, the list of available categories corresponding to the available media files for the user, wherein:

the first display area comprises the home position and the one or more secondary positions; and the one or more secondary positions comprise the list of available categories;

receiving, from the user, a second selection of a category of the list of available categories;

in response to receiving the second selection of the category of the list of available categories from the user:

automatically transmitting fourth instructions to display the category of the list of available categories in the home position of the first display area;

automatically transmitting instructions to replace the list of available categories in the one or more secondary positions of the first display area with a list of available media sub-categories corresponding to the second selection of the category of the list of available categories; and automatically transmitting fifth instructions to display, in the second display area, media files of the available media files corresponding to the second selection of the category of the list of available categories, the media files of the available media files corresponding to the second selection of the category of the list of available categories comprising the at least one partially viewed media file;

receiving, from the user, a third selection of the playback selection button for a selected one of the at least one partially viewed media file, the third selection of the playback selection button received from the user indicating a request to watch the selected one of the at least one partially viewed media file on the first display associated with the first device; and transmitting instructions to display the selected one of the at least one partially viewed media file on the first device in such a manner as to result in playback of the selected one of the at least one partially viewed media file starting at the viewed time of the selected one of the at least one partially viewed media file, as selected via the third selection of the playback selection button, on the first display associated with the first device.

20. The method of claim 19 further comprising:

receiving, from the menu on the second display associated with the second device of the user, a fourth selection indicating a request to watch the selected media file on the second display associated with the second device; and transmitting the selected media file to the second device in such a manner as to result in playback of the selected media file starting at the viewed time of the selected media file on the second display associated with the second device.

21. The method of claim 19 further comprising:

in response to automatically transmitting the instructions to exit out of the second display area:
  transmitting instructions to automatically expand the second display area; and
  transmitting instructions to automatically shrink the first display area.

22. A system comprising:

one or more processors; and one or more non-transitory computer-readable media storing computing instructions configured to run on the one or more processors and perform acts of:
  receiving a log-in request from a user of a first device;
  accessing account information of the user to find available media files for the user;
  receiving a first selection from the user indicating a request to watch a selected media file of the available media files;
  transmitting the selected media file to the user in such a manner as to result in playback of the selected media file on a first display associated with the first device;
  receiving an indication from the user to stop the playback of the selected media file on the first display associated with the first device at a viewed time;
  storing the viewed time of the selected media file with the account information of the user for playback of the selected media file at the viewed time on (1) the first display associated with the first device or (2) a second display associated with a second device;
  transmitting instructions to display a menu on one of the first display associated with the first device or the second display associated with the second device, wherein:
    the menu comprises a first display area and a second display area;
    the first display area is present, but has a list of available categories, a home position, and one or more secondary positions hidden from view in the first display area;
    the second display area comprises:
      a list of available media selections comprising popular media selections, new media selections, recommended media selections, and partially viewed media selections;
    the partially viewed media selections comprise:
      media information regarding the selected media file comprising a title of the selected media file and the viewed time of the selected media file; and
      a box for each respective partially viewed media selection of the partially viewed media selections from the list of available media files; and
    the box for each respective partially viewed media selection of the partially viewed media selections from the list of available media files comprises:
      (1) a respective graphical representation of the partially viewed media selection;
      (2) a respective playback selection button; and
      (3) adjacent the respective playback selection button, a visual representation of the viewed time for the partially viewed media selection;
  receiving, from the user, second instructions to display menu items in the first display area;
  transmitting third instructions to display, in the first display area, the list of available categories corresponding to the available media files for the user, wherein:
    the first display area comprises the home position and the one or more secondary positions; and
    the one or more secondary positions comprise the list of available categories;
  receiving, from the user, a second selection of a category of the list of available categories;
  in response to receiving the second selection of the category of the list of available categories from the user:
    automatically transmitting fourth instructions to display the category in the home position of the first display area;
    automatically transmitting instructions to replace the list of available categories in the one or more secondary positions of the first display area with a list of available media sub-categories corresponding to the second selection of the category of the list of available categories; and
    automatically transmitting fifth instructions to display, in the second display area, media files of the available media files corresponding to the second selection of the category, the media files of the available media files corresponding to the second selection of the category comprising at least one partially viewed media selection of the partially viewed media selections;
  receiving, from the user, a third selection of the playback selection button for the partially viewed media selection of the partially viewed media selections, the third selection received from the user indicating a request to watch the at least one partially viewed media selection of the partially viewed media selections on the first display associated with the first device; and transmitting instructions to display the at least one partially viewed media selection of the partially viewed media selections on the first device in such a manner as to result in playback of the at least one partially viewed media selection of the partially viewed media selections, as selected via the third selection starting at the viewed time of the selected partially viewed media selection of the partially viewed media selections on the first display associated with the first device.

23. The system of claim 22, wherein the computing instructions further comprise:

receiving, from the menu on the second display associated with the second device of the user, a fourth selection indicating a request to watch the selected media file on the second display associated with the second device; and transmitting the selected media file to the second device in such a manner as to result in playback of the selected media file starting at the viewed time of the selected media file on the second display associated with the second device.

24. The system of claim 22, wherein the computing instructions further comprise:

receiving, form the user, a third selection of a media sub-category of the available media sub-categories, wherein the available media sub-categories are dynamically generated based on a previous history of one or more media sub-category selections of the user; and in response to receiving the third selection of the media sub-category of the available media sub-categories:
automatically transmitting instructions to replace the media files of the available media files corresponding to the first selection of the category of the list of available categories in the second display area with media files of the available media files corresponding to the third selection of the media sub-category of the available media sub-categories, the media files of the available media files corresponding to the third selection of the media sub-category comprising the at least one partially viewed media file.

* * * * *